US011107150B2

(12) United States Patent
Houston et al.

(10) Patent No.: US 11,107,150 B2
(45) Date of Patent: Aug. 31, 2021

(54) AD HOC ITEM GEO TEMPORAL LOCATION AND ALLOCATION APPARATUSES, METHODS AND SYSTEMS

(71) Applicant: Beachy Co., Nashville, TN (US)

(72) Inventors: Matthew Stephen Houston, Brentwood, TN (US); David Michael Stange, Nolensville, TN (US); Joshua Paul Aronson, Nashville, TN (US)

(73) Assignee: Beachy Co., Nashville, TN (US)

(*) Notice: Subject to any disclaimer, the term of this patent is extended or adjusted under 35 U.S.C. 154(b) by 607 days.

(21) Appl. No.: 15/645,934

(22) Filed: Jul. 10, 2017

(65) Prior Publication Data

US 2018/0012290 A1 Jan. 11, 2018

Related U.S. Application Data

(60) Provisional application No. 62/360,454, filed on Jul. 10, 2016.

(51) Int. Cl.
*G06F 21/62* (2013.01)
*G06Q 30/06* (2012.01)
(Continued)

(52) U.S. Cl.
CPC ........ *G06Q 30/0641* (2013.01); *G06F 16/29* (2019.01); *G06F 16/9537* (2019.01);
(Continued)

(58) Field of Classification Search
USPC ..... 717/101; 705/1.1, 7.11, 7.12, 7.22, 7.23, 705/7.24, 7.25
See application file for complete search history.

(56) References Cited

U.S. PATENT DOCUMENTS

2007/0112511 A1* 5/2007 Burfeind .............. G08G 5/0021
701/469
2007/0204218 A1 8/2007 Weber et al.
(Continued)

OTHER PUBLICATIONS

International Search Report and Written Opinion dated Sep. 29, 2017 for Application No. PCT/US2017/041412, filed on Jul. 10, 2017.

*Primary Examiner* — Akiba K Robinson
(74) *Attorney, Agent, or Firm* — Hanchukkheit LLP; Walter G. Hanchuk

(57) ABSTRACT

The Ad Hoc Item Geo Temporal Location and Allocation Apparatuses, Methods and Systems ("GeoTemp") transforms user requested area (202), user layout request (1102), user request for product items (1402), layout, section, unit/item position, zone, user item selection inputs via GeoTemp components into location map (230), layout position (1135), booking (1026), goods services dispatch (1326, 1430), item reservation, item directions, inventory request, inventory delivery outputs. The GeoTemp includes an ad hoc geographical and temporal mapping and item allocation apparatus, comprising: a memory and a component collection in the memory. The GeoTemp further includes a processor disposed in communication with the memory, and configured to issue a plurality of processing instructions from the component collection stored in the memory, wherein the processor issues instructions from the component collection, stored in the memory. It includes instructions to obtain geographical layout message, and composite a geo-temporal map including asset items allocated within the confines defined by the geographical layout message. The GeoTemp also includes instructions to obtain an asset selection message from a user, allocate a selected asset for the user, update inventory availability accounting for the selected asset, and
(Continued)

provide updated composite geo-temporal map including updated inventory availability.

10 Claims, 19 Drawing Sheets

(51) Int. Cl.
*G06F 16/29* (2019.01)
*G06F 16/9537* (2019.01)
*G06Q 10/02* (2012.01)
*G06F 3/0482* (2013.01)

(52) U.S. Cl.
CPC ......... *G06Q 10/02* (2013.01); *G06Q 30/0633* (2013.01); *G06F 3/0482* (2013.01)

(56) References Cited

U.S. PATENT DOCUMENTS

| | | |
|---|---|---|
| 2008/0017709 A1 | 1/2008 | Kennedy |
| 2011/0131172 A1 | 6/2011 | Herzog |
| 2012/0317478 A1 | 12/2012 | Hantschel et al. |
| 2014/0040179 A1 | 2/2014 | Herzog et al. |
| 2016/0027065 A1* | 1/2016 | Fleischman ...... H04N 21/23424 725/34 |

\* cited by examiner

Fig.1: GeoTemp—map region UI
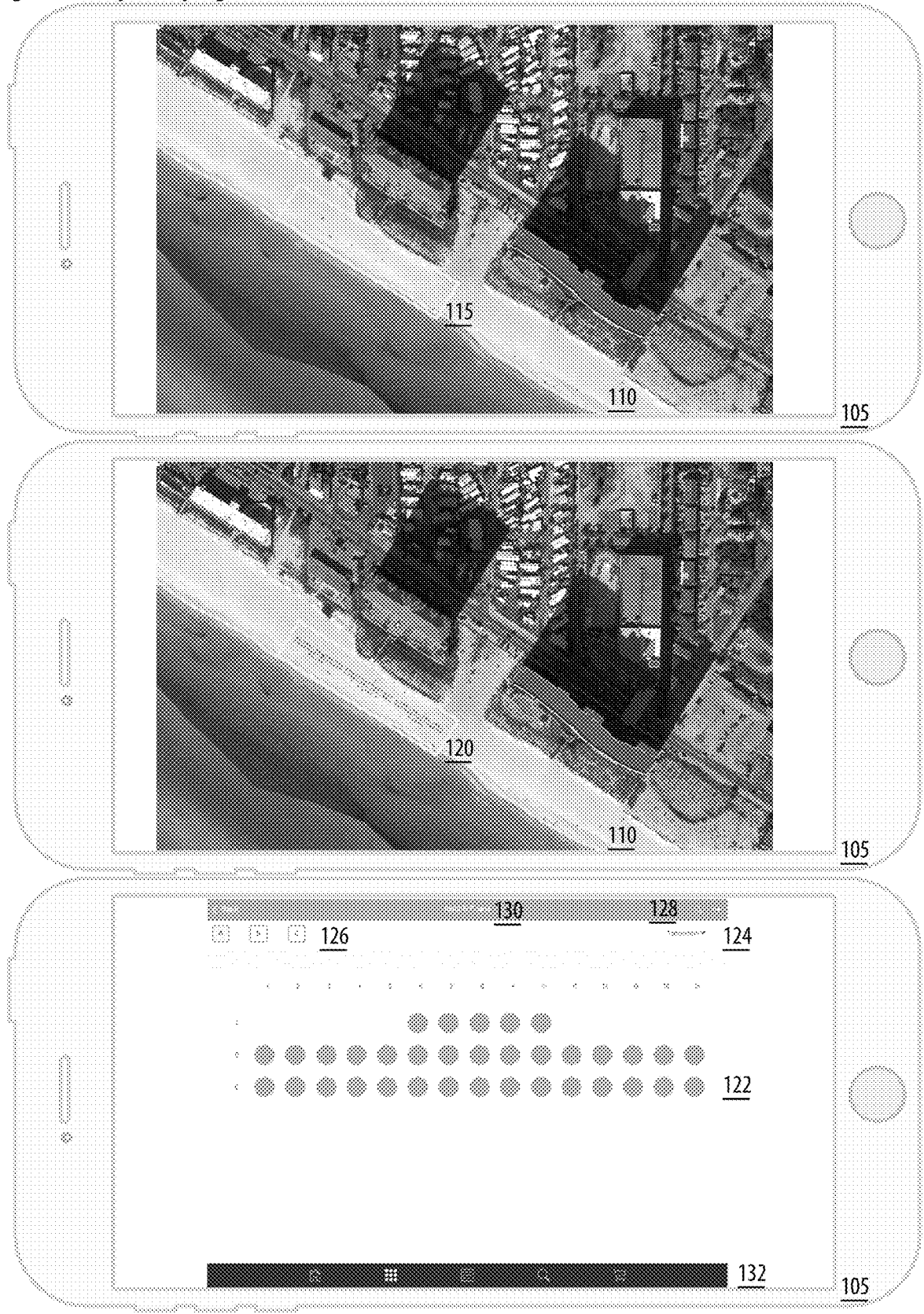

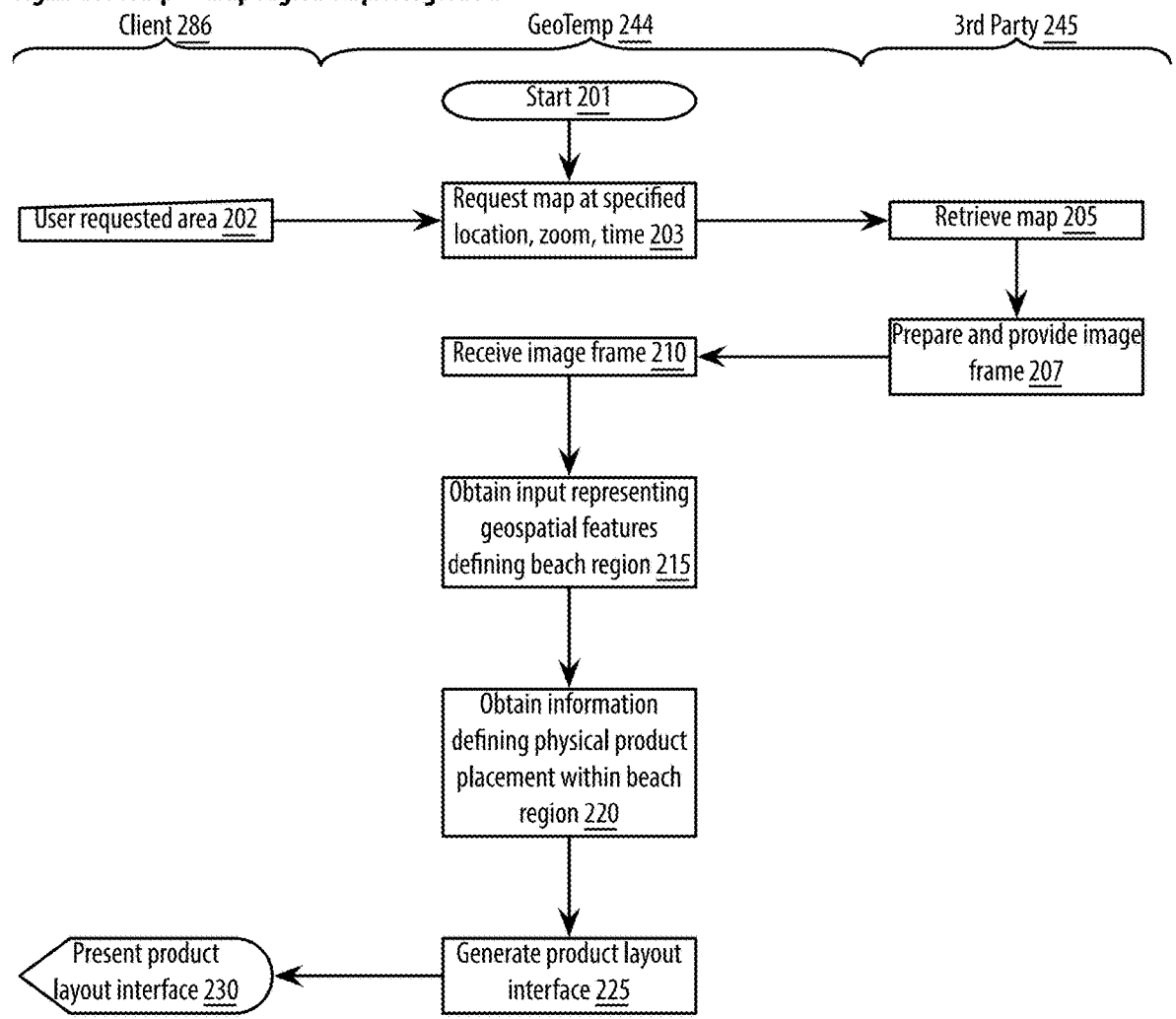

Fig.3: GeoTemp—booking from clip UI
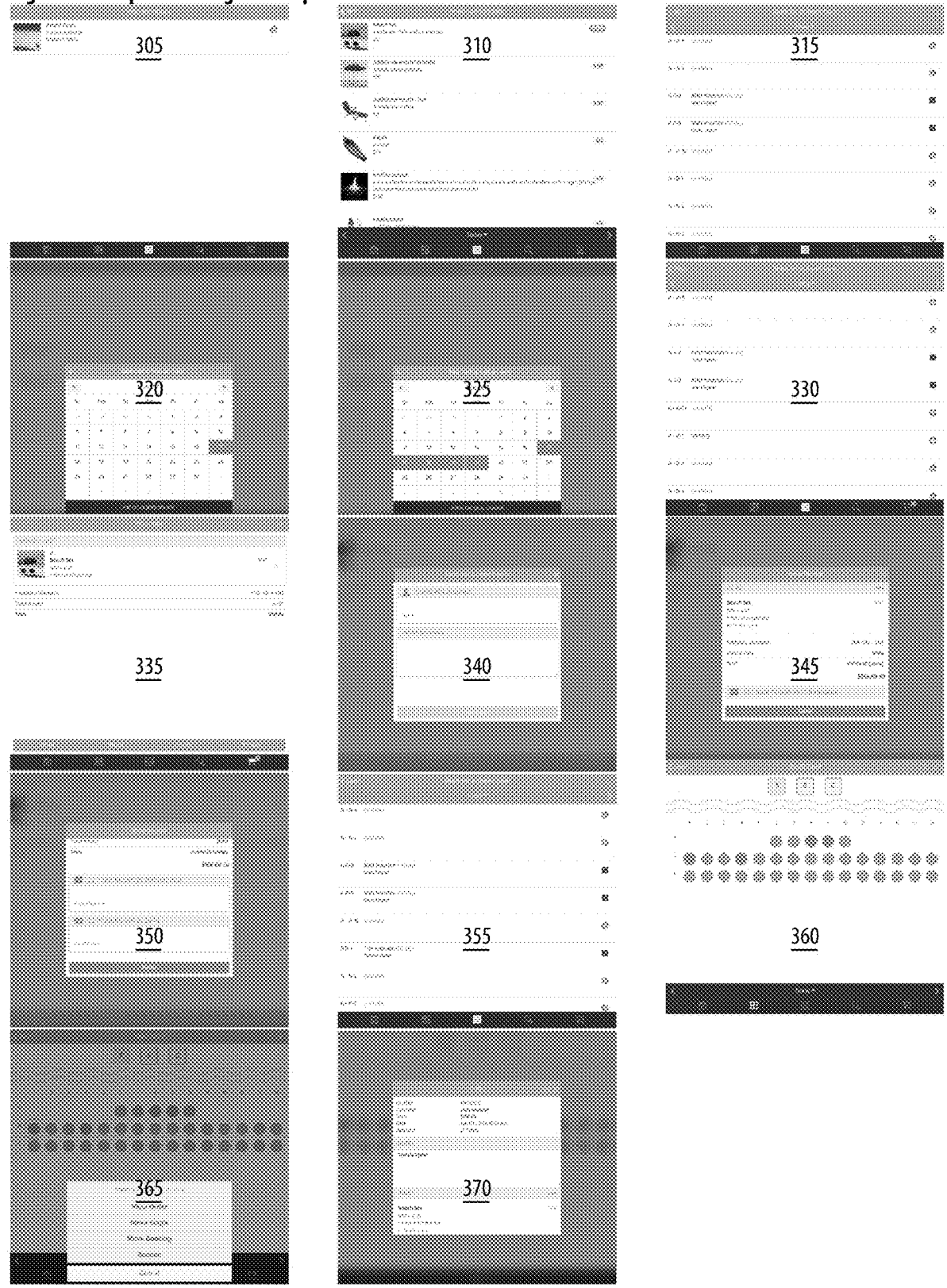

Fig.4: GeoTemp—booking layout UI
405
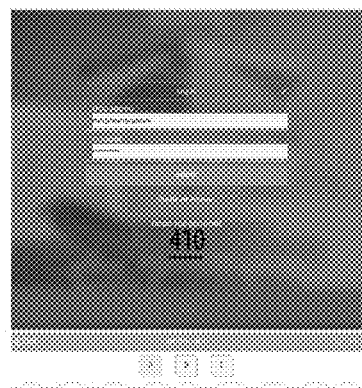
410
415
420
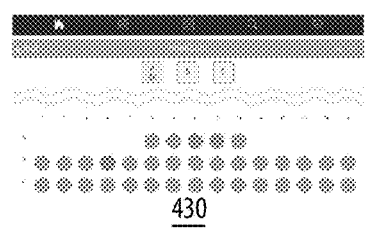
425
430
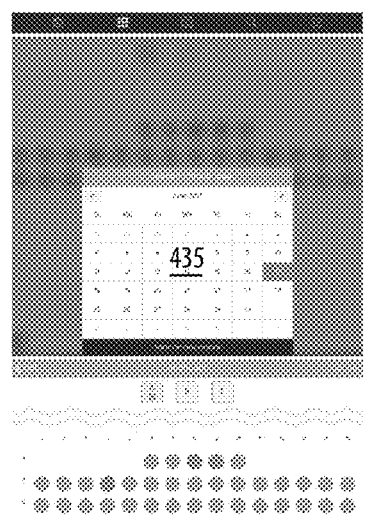
435
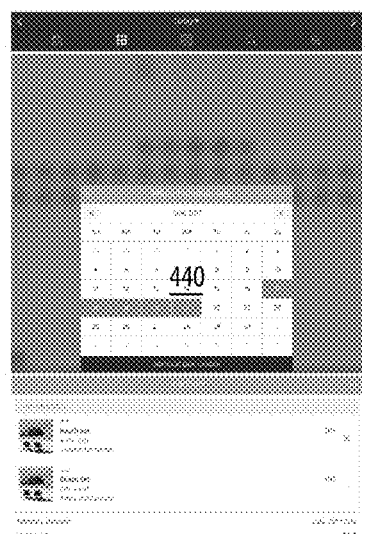
440
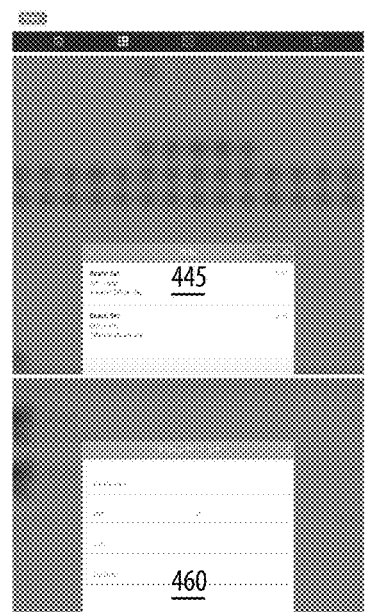
445
450
455
460
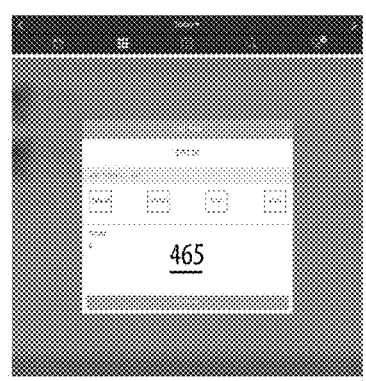
465
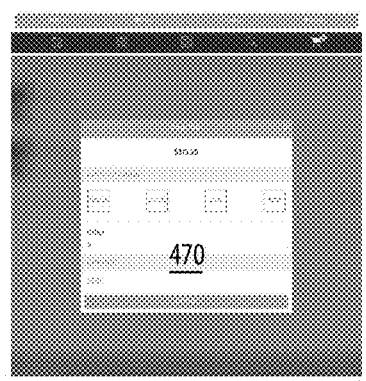
470
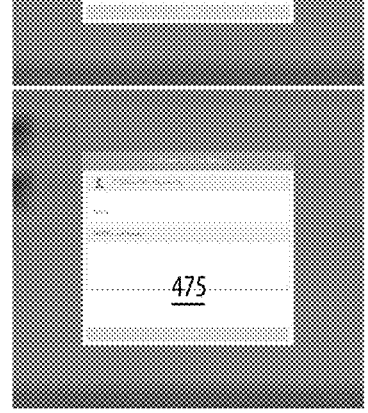
475

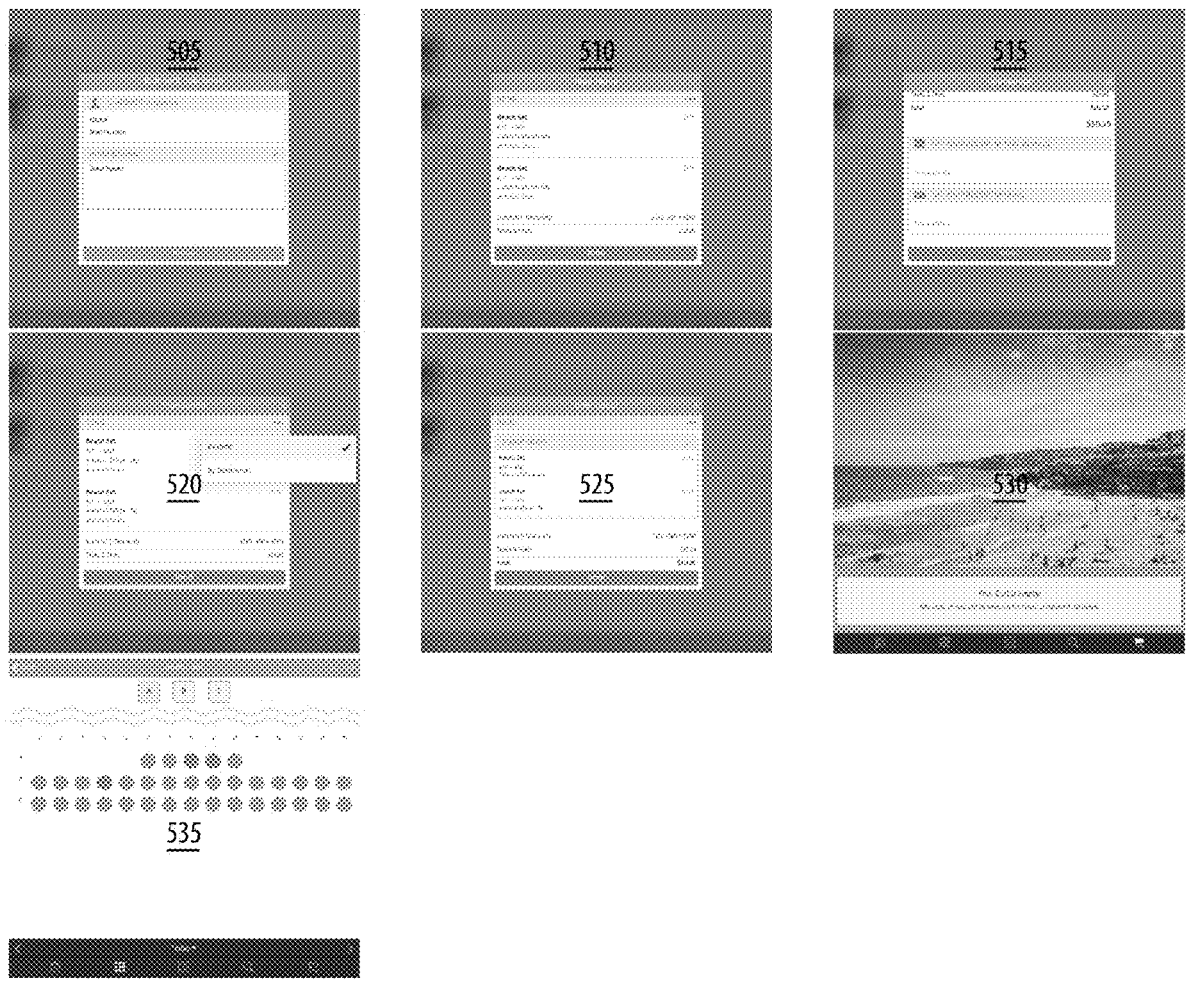

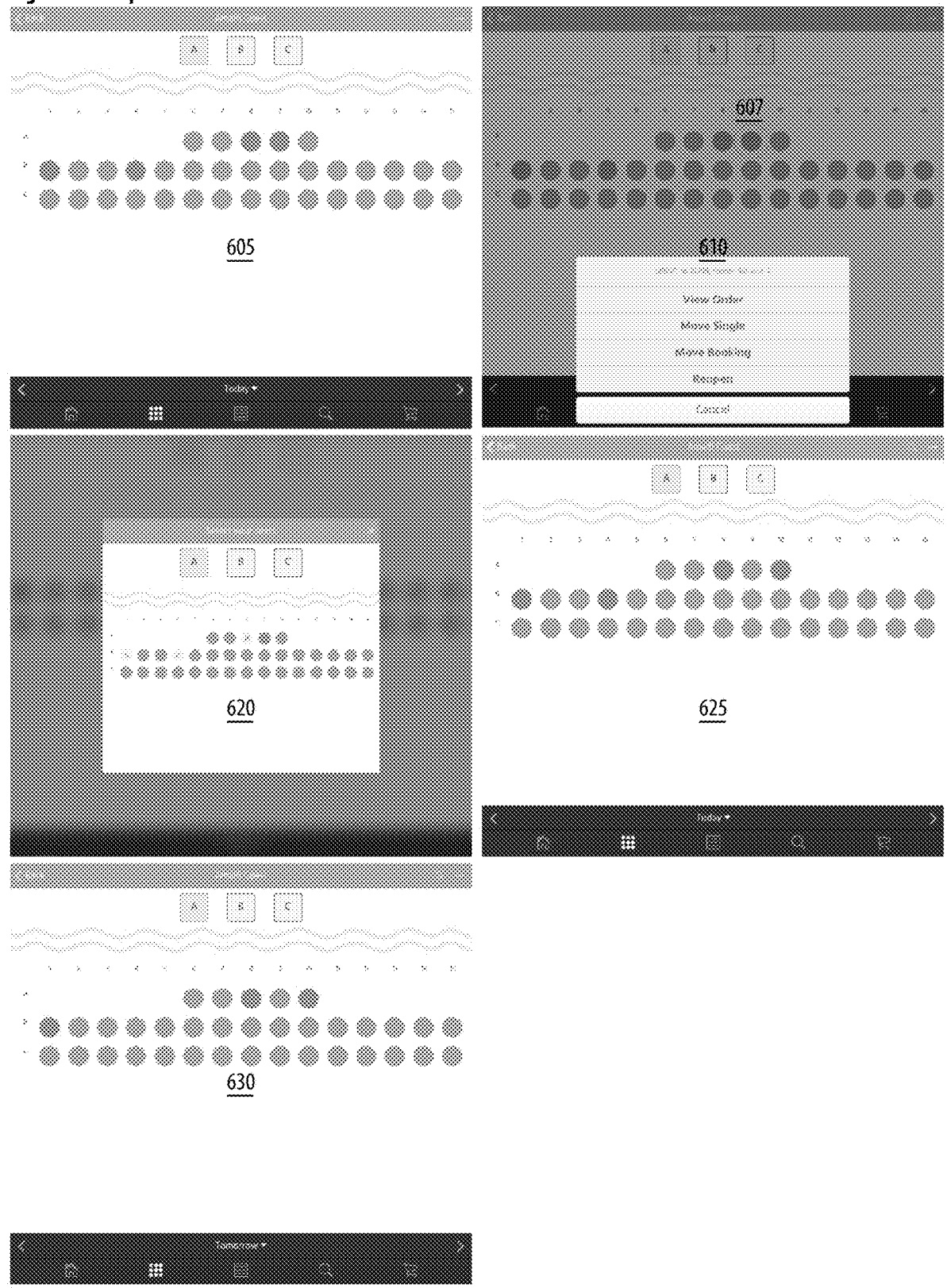
Fig.6: GeoTemp—order move UI

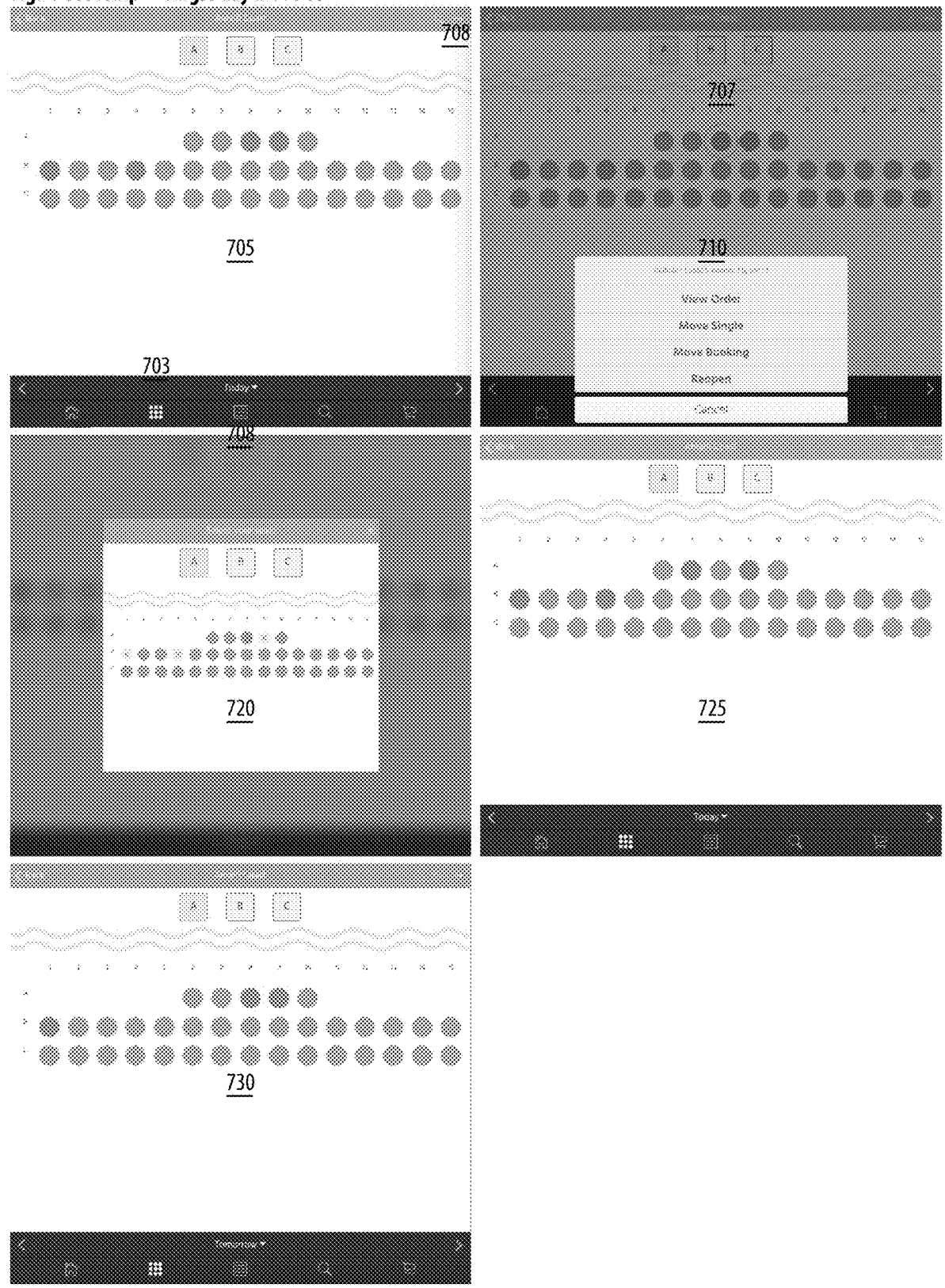
Fig.7: GeoTemp—single day move UI

Fig.8: GeoTemp—online order UI
805
810
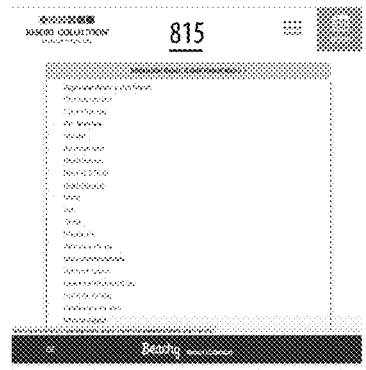
815
820
825
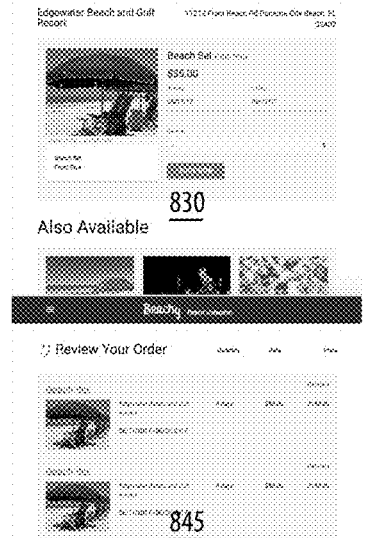
830
835
840
845
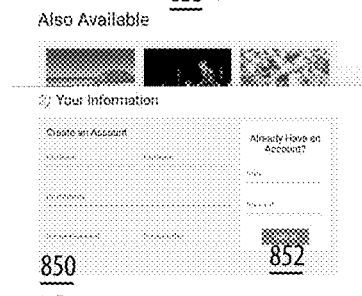
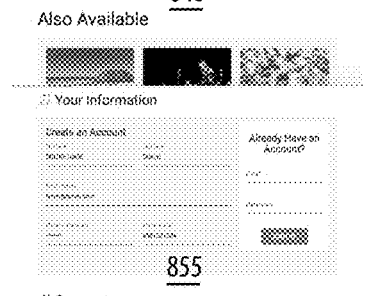
Also Available
Also Available
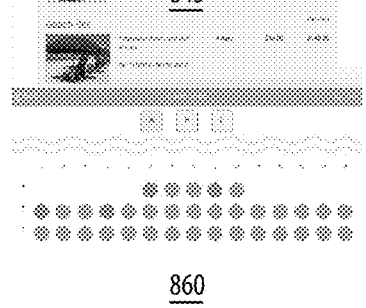
860
850  852
855
857
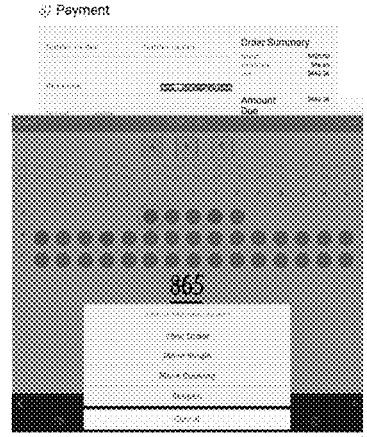
865
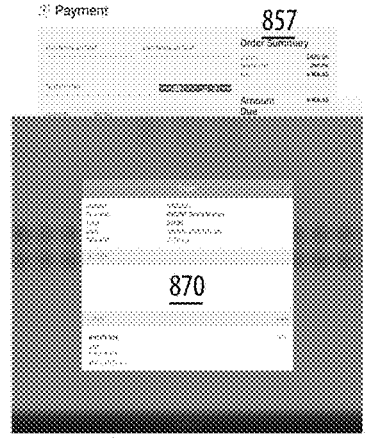
870

Fig.9: GeoTemp—reopen order UI
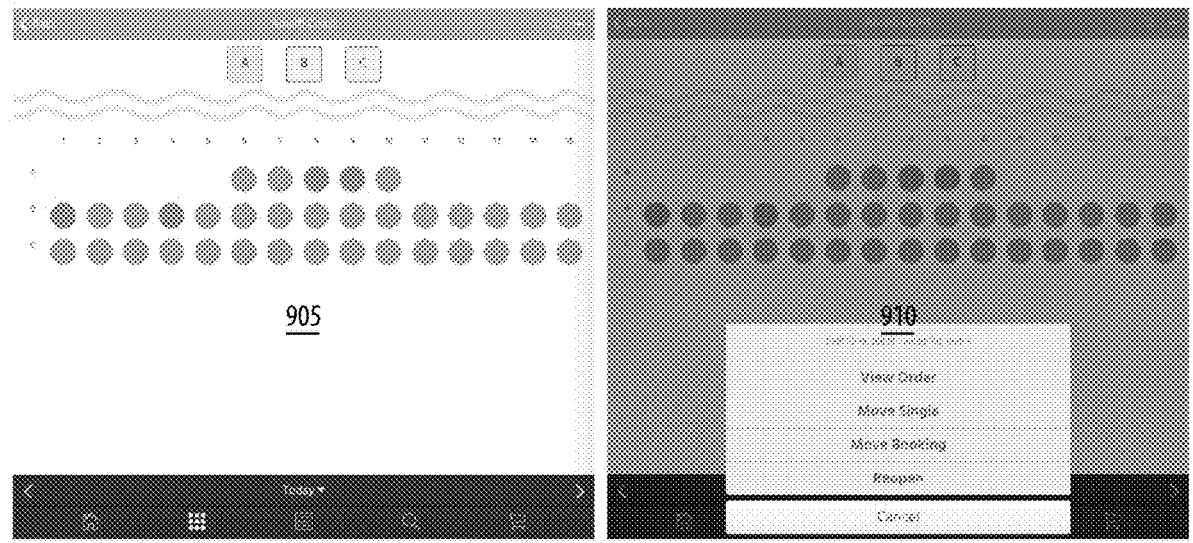
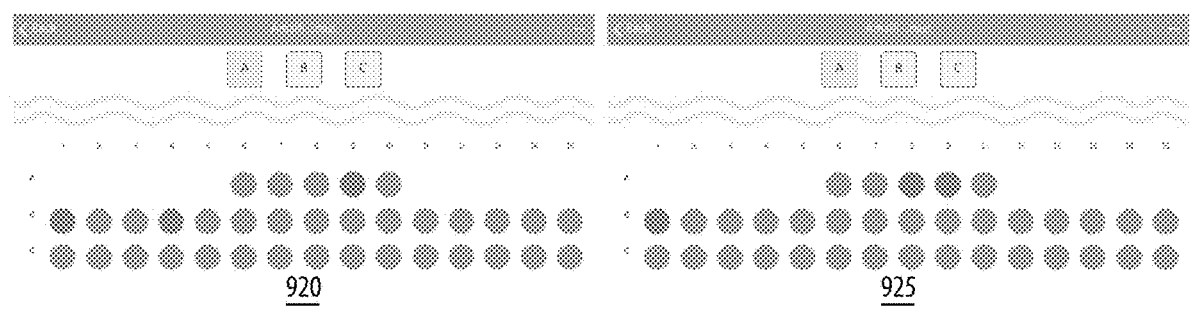

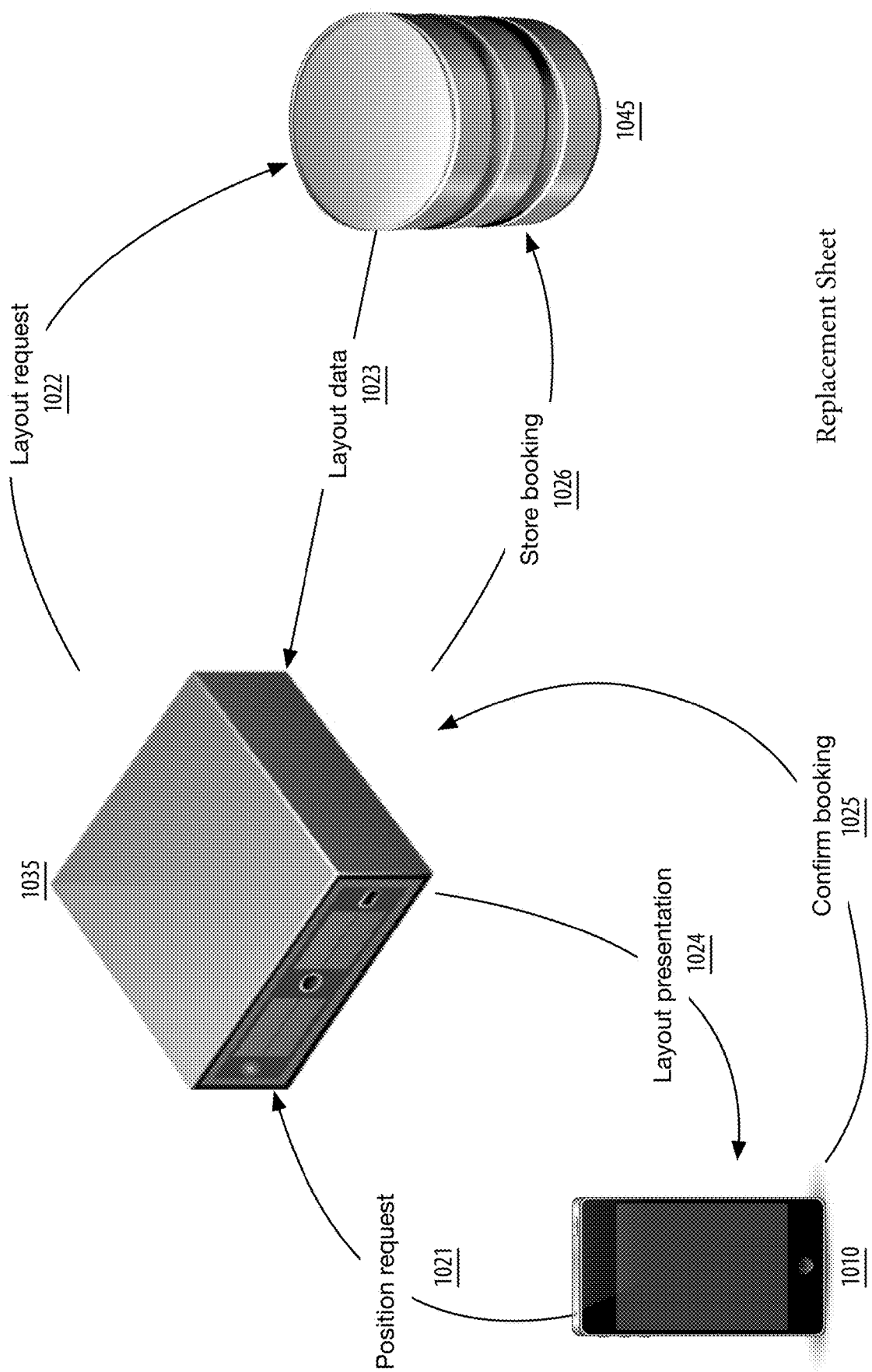
Fig.10: GeoTemp—location order datagraph

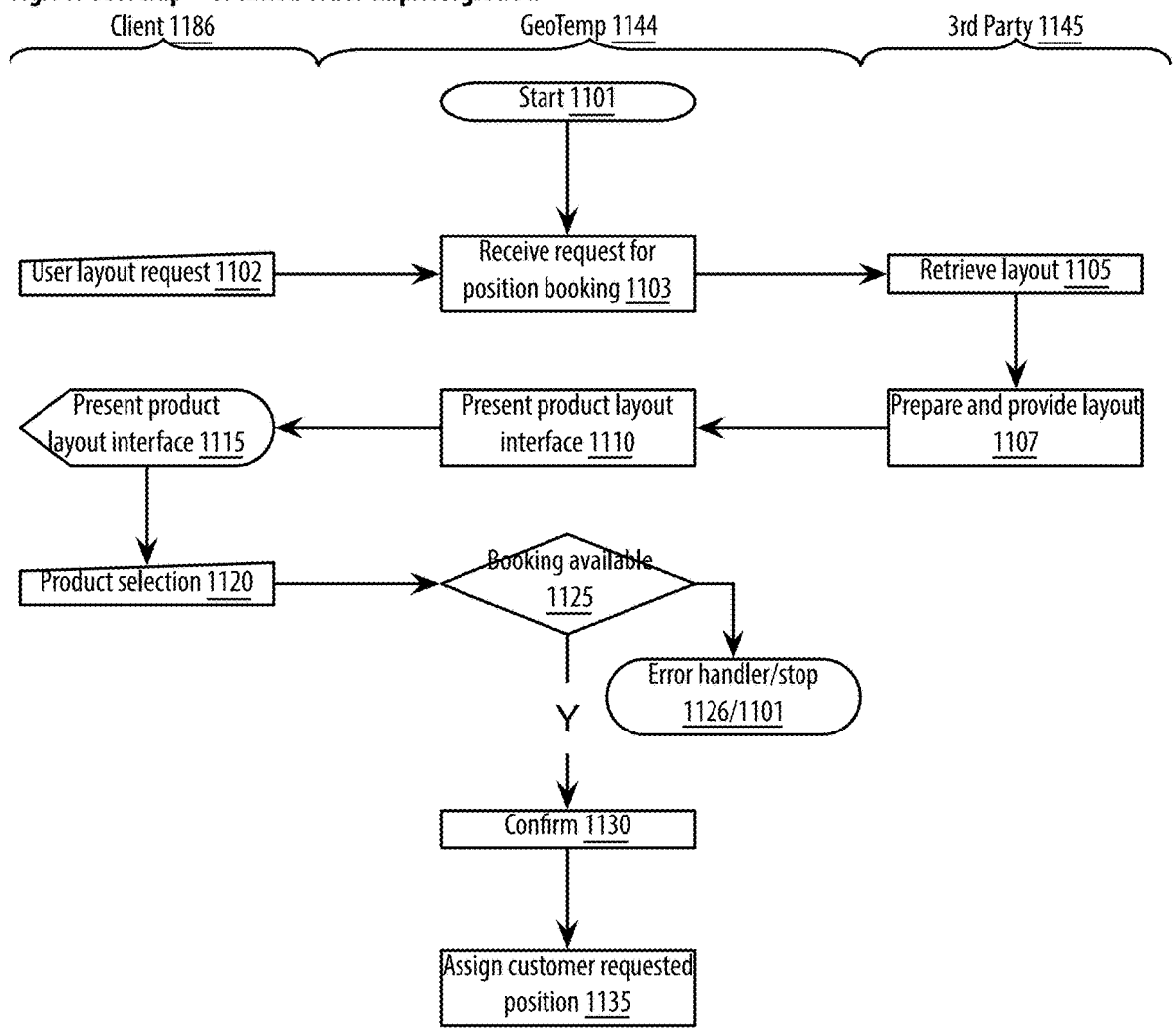

Fig.12: GeoTemp—product items order UI
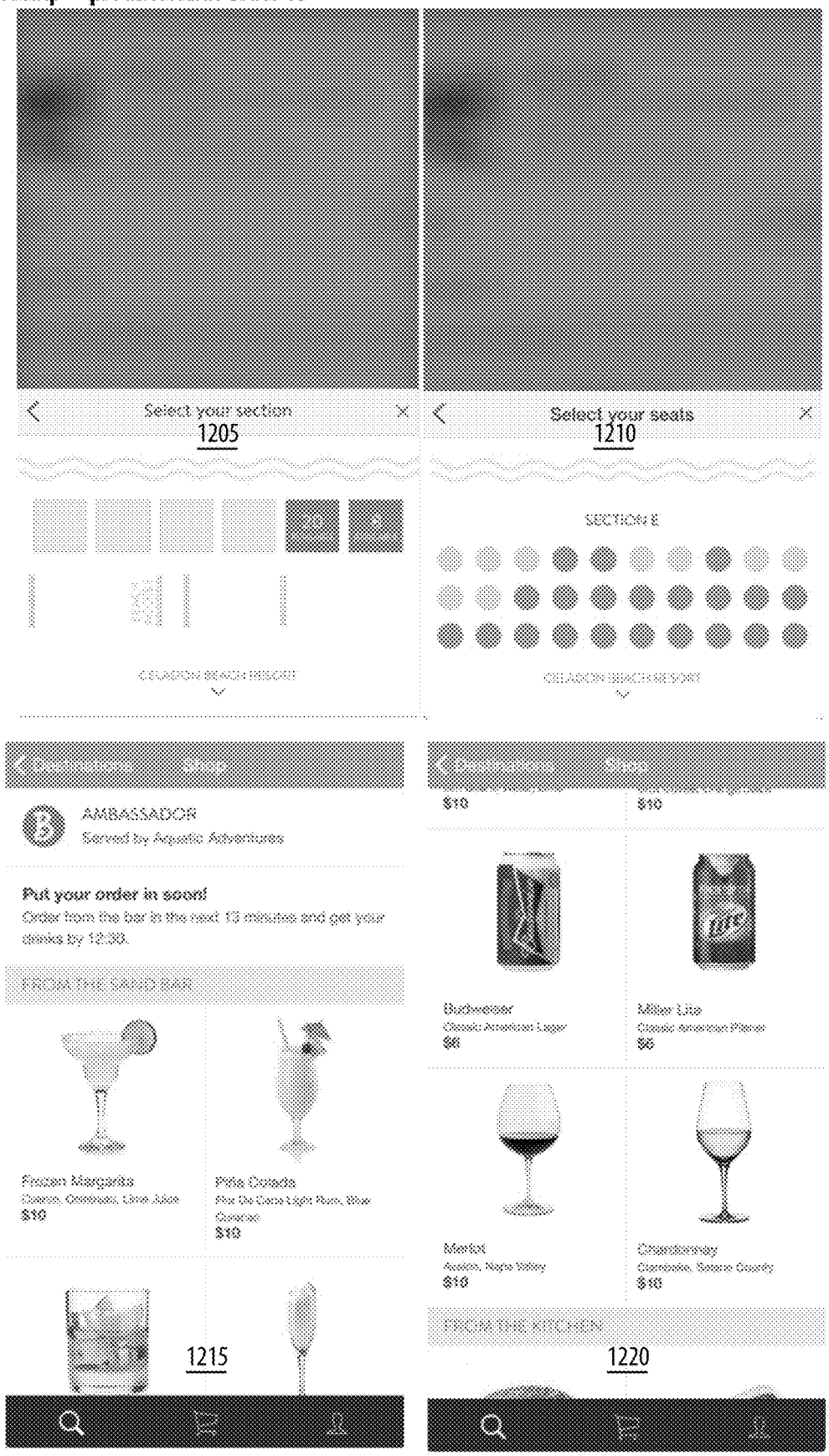

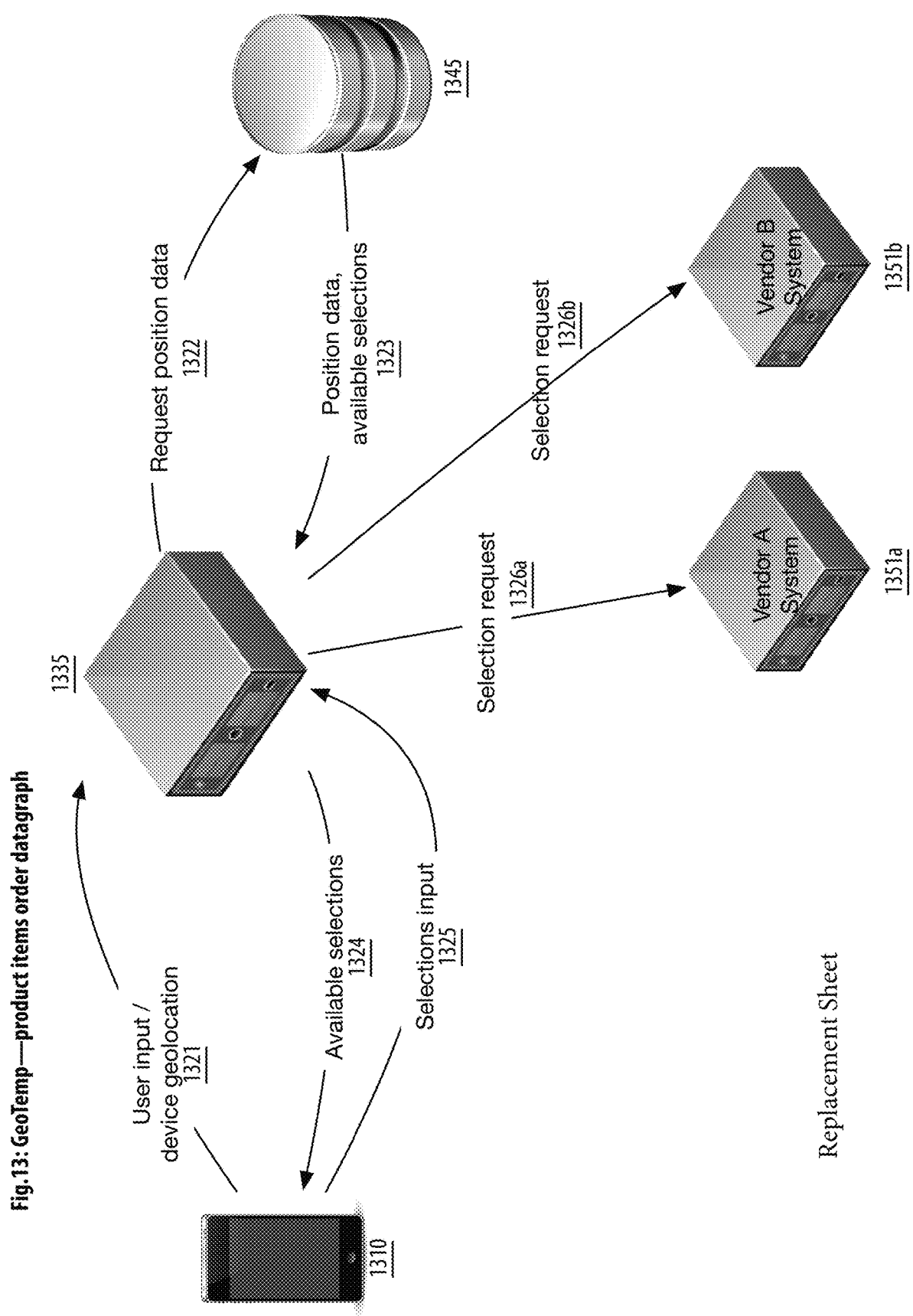

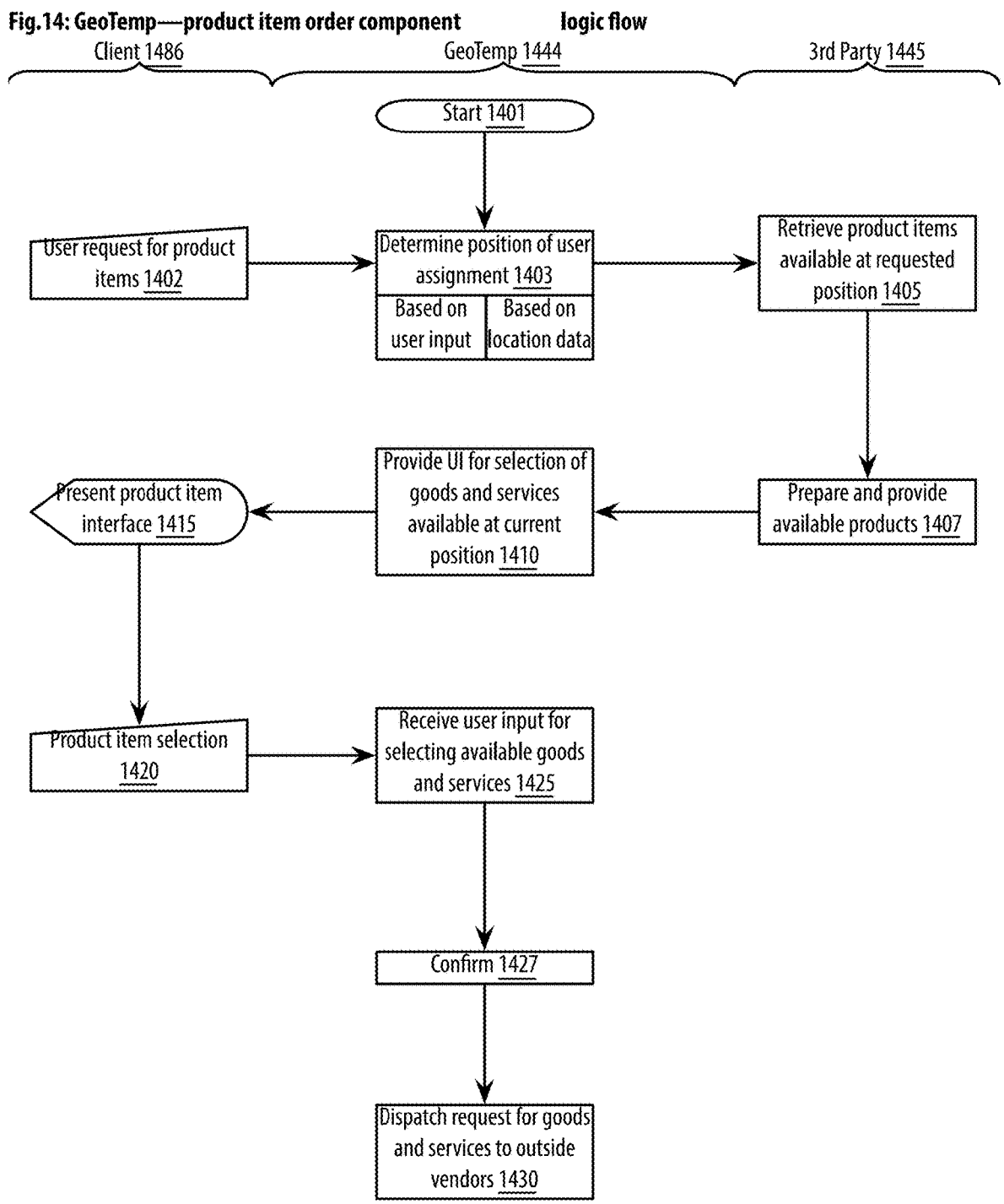

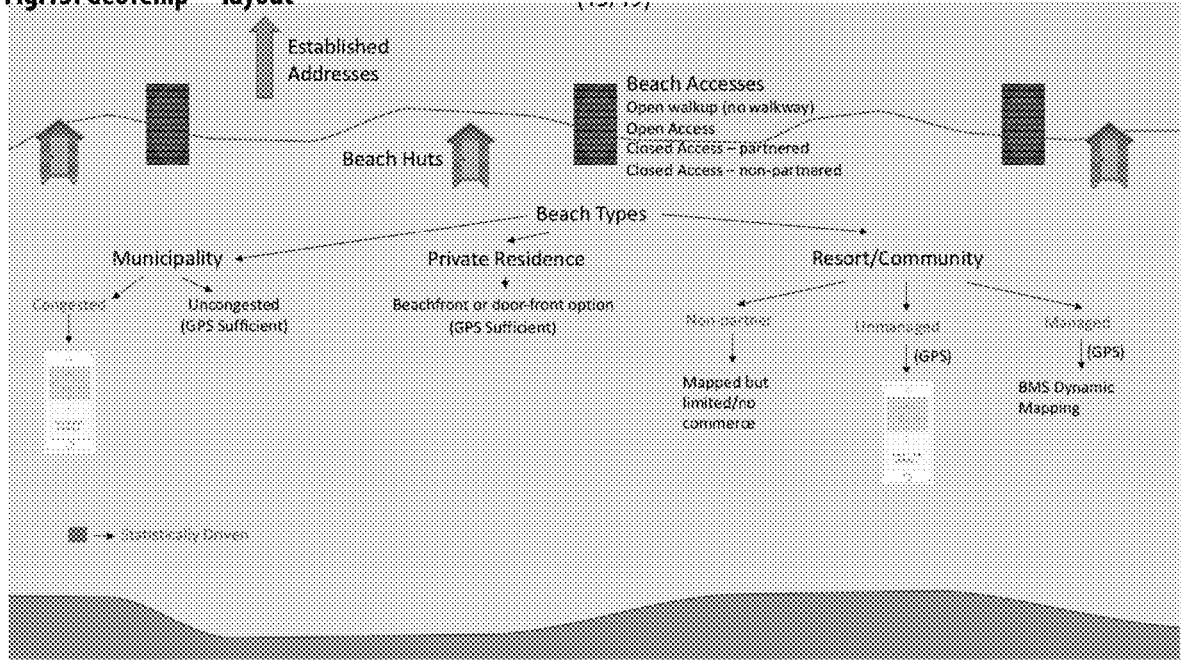
Fig.15: GeoTemp—layout
1501
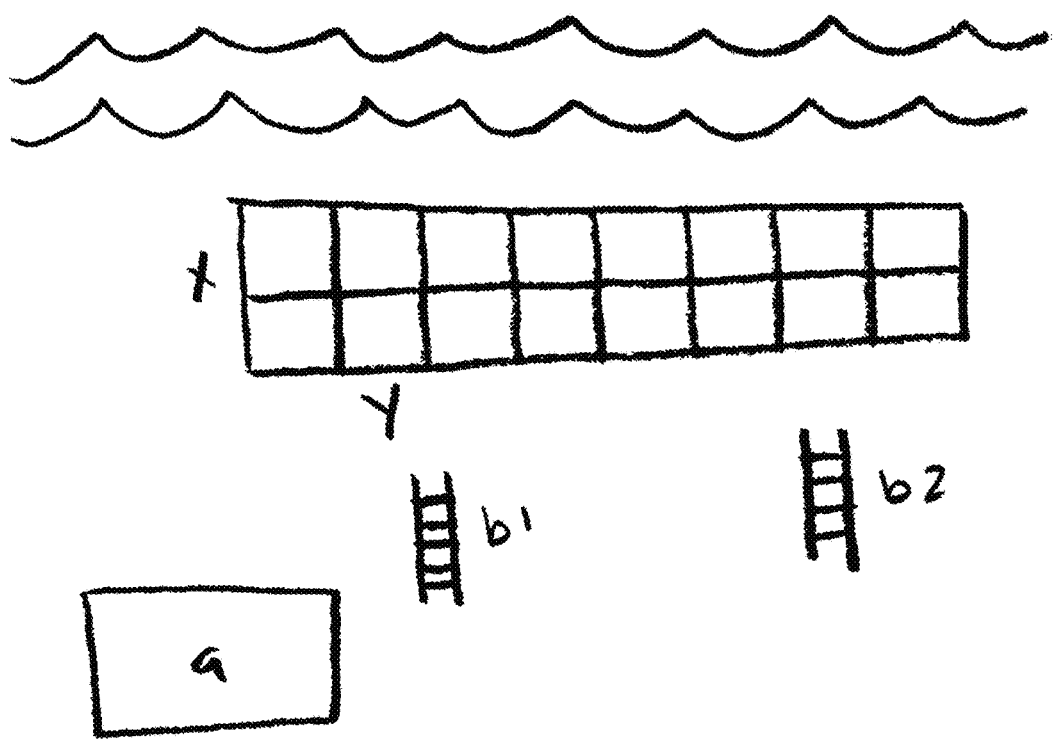
1550

Fig.16: GeoTemp—layout
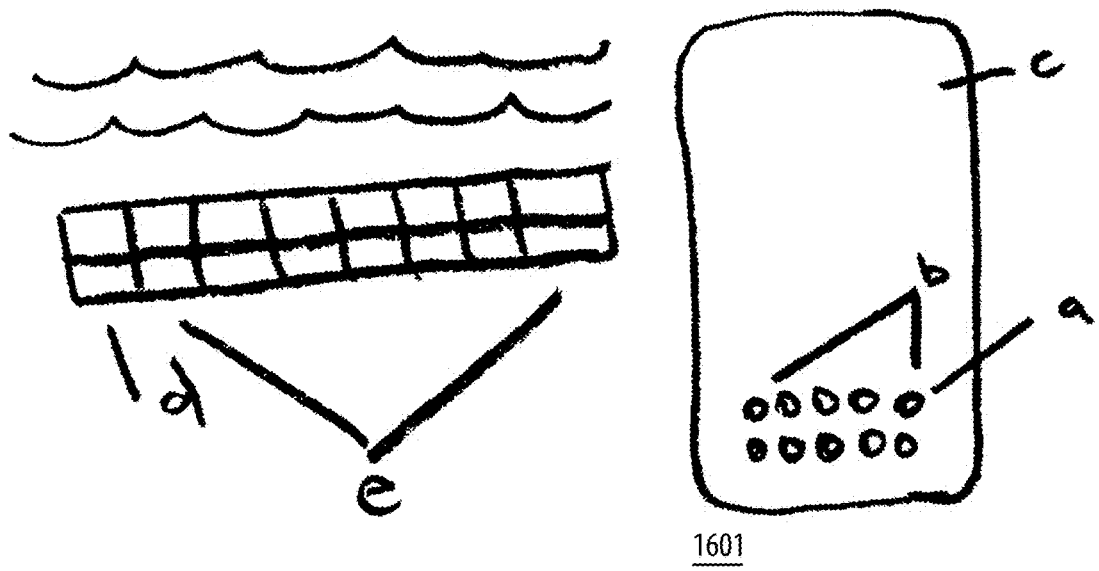
1601
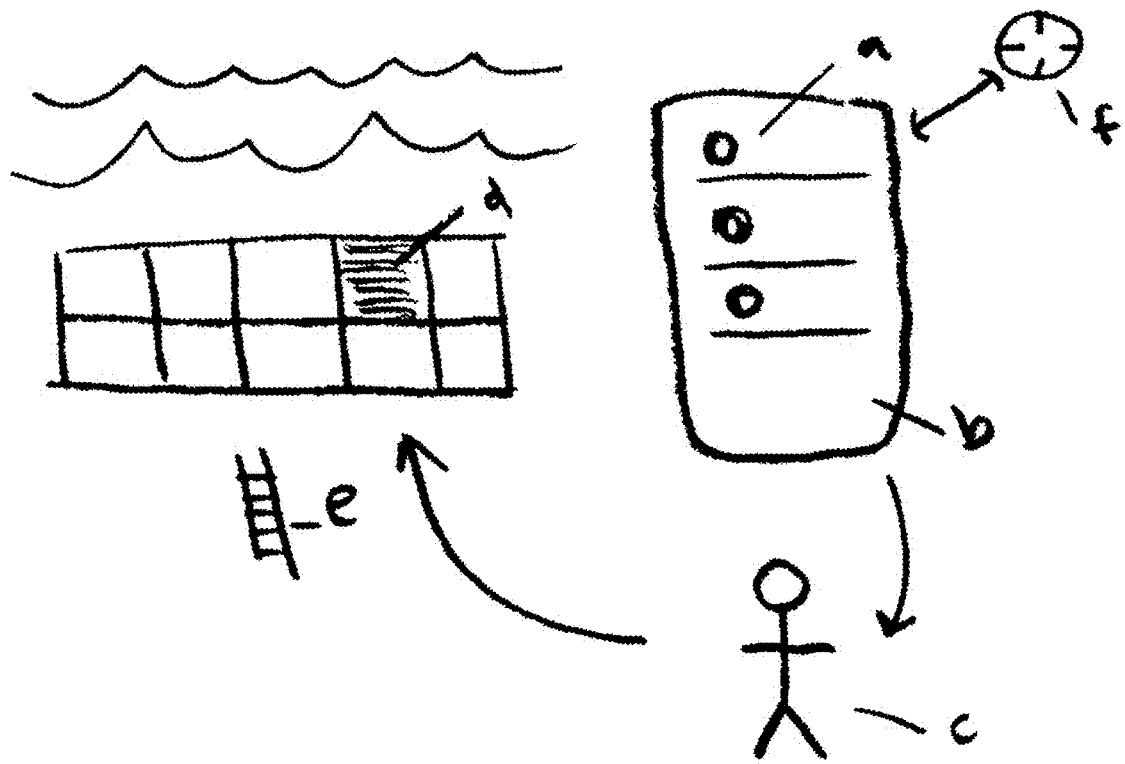
1650

Fig.17: GeoTemp—layout
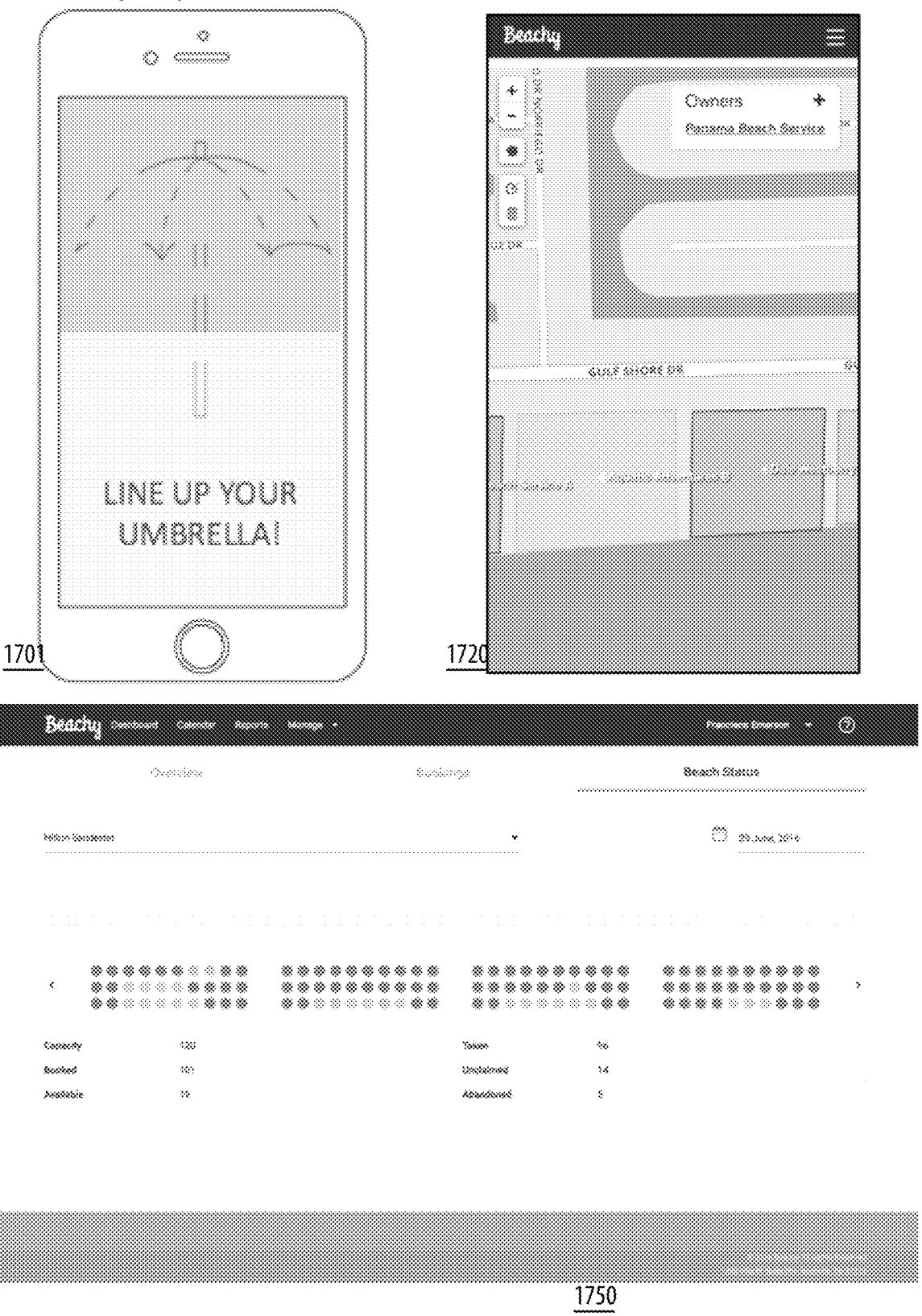

Fig.18: GeoTemp—screenshots
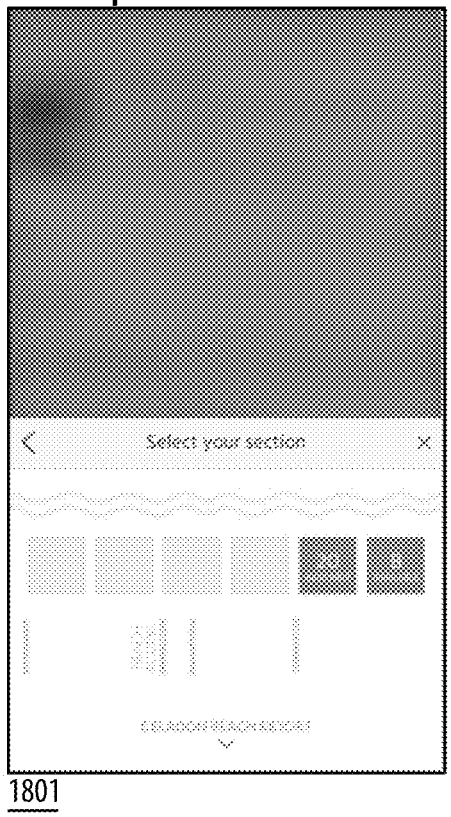
1801
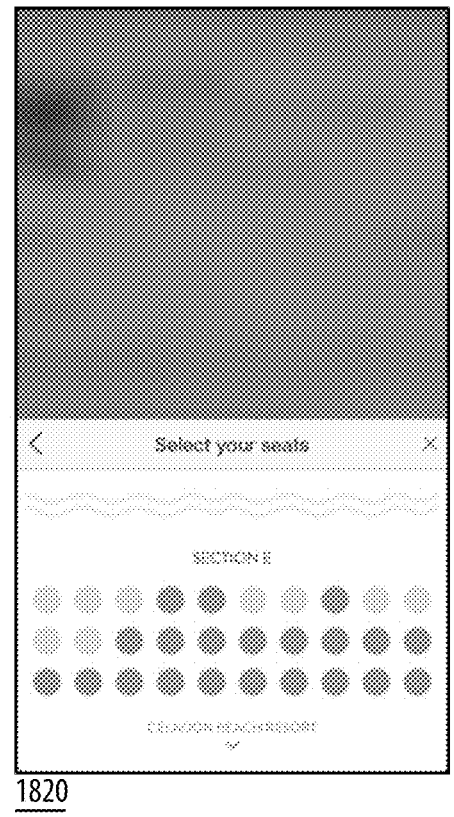
1820
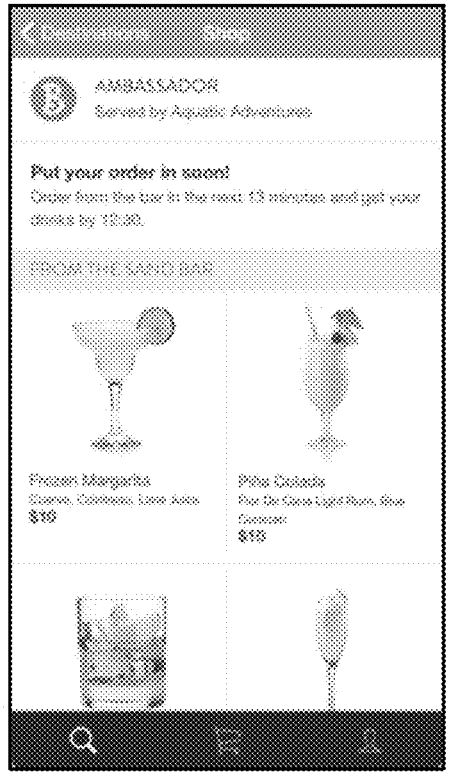
1840
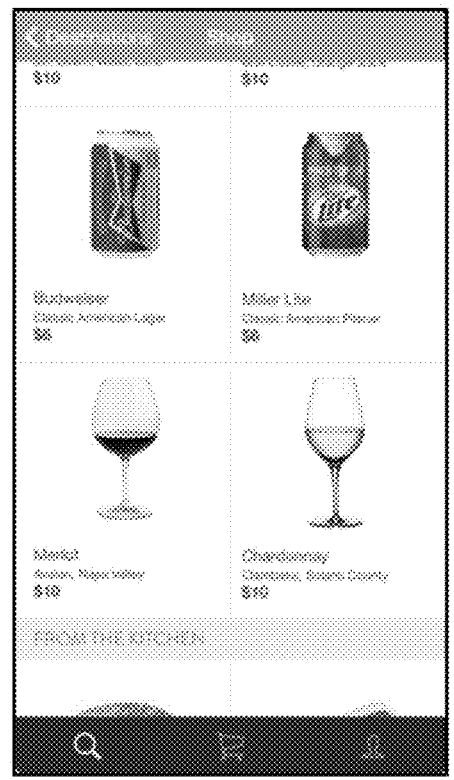
1860

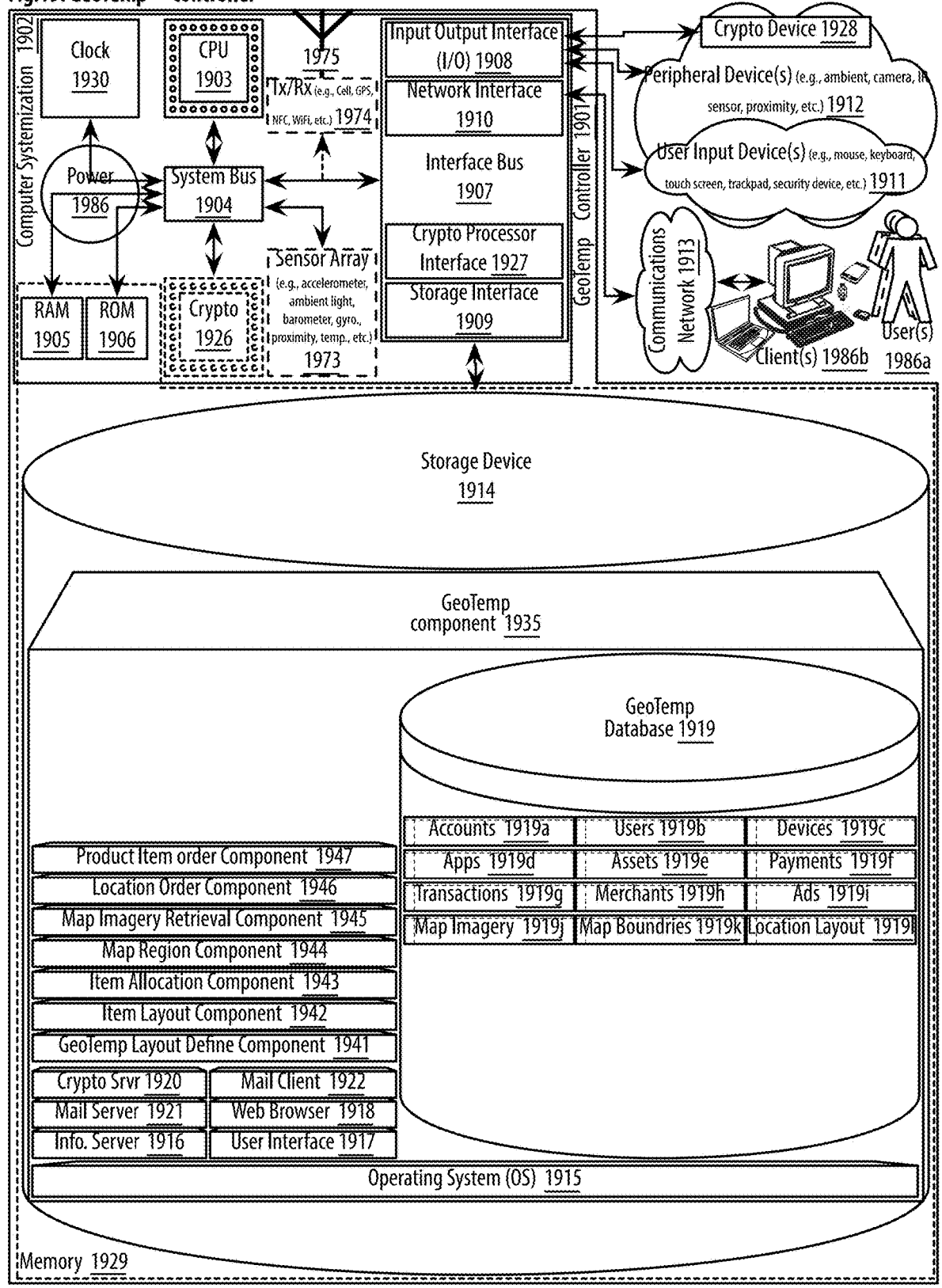
Fig.19: GeoTemp—controller

AD HOC ITEM GEO TEMPORAL LOCATION AND ALLOCATION APPARATUSES, METHODS AND SYSTEMS

PRIORITY CLAIM

Applicant hereby claims benefit to priority under 35 USC § 119 as a non-provisional conversion of: U.S. provisional patent application Ser. No. 62/360,454, filed Jul. 10, 2016, entitled "Ad Hoc Item Geo Temporal Location and Allocation Apparatuses, Methods and Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address geo-location and inventory allocation, and more particularly, include Ad Hoc Item Geo Temporal Location and Allocation Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Global positioning systems include satellites and receiving devices which can ascertain their position on the globe based on measuring signals received from satellites, cell towers, WiFi and other signal sources. Services such as Apple and Google maps exist that include satellite mappings of global terrain, and are a collection of mapping imagery.

BRIEF DESCRIPTION OF THE DRAWINGS

Appendices and/or drawings illustrating various, non-limiting, example, innovative aspects of the Ad Hoc Item Geo Temporal Location and Allocation Apparatuses, Methods and Systems (hereinafter "GeoTemp") disclosure, include:

FIG. 1 shows a block diagram illustrating user interface embodiments of the GeoTemp;

FIG. 2 shows a logic flow diagram illustrating embodiments of a map region component for the GeoTemp;

FIG. 3 shows a screenshot diagram illustrating embodiments of a booking for the GeoTemp;

FIGS. 4 and 5 show a screenshot diagram illustrating embodiments of a booking for the GeoTemp;

FIGS. 6 and 7 show screenshot diagrams illustrating embodiments of a moving orders the GeoTemp;

FIG. 8 shows a screenshot diagram illustrating embodiments of an online order for the GeoTemp;

FIG. 9 shows a screenshot diagram illustrating embodiments to reopen an order for the GeoTemp;

FIG. 10 shows a datagraph diagram illustrating embodiments of a layout booking for the GeoTemp;

FIG. 11 shows a logic flow diagram illustrating embodiments of a location order component for the GeoTemp;

FIG. 12 shows a screenshot diagram illustrating embodiments of item product ordering an order for the GeoTemp;

FIG. 13 shows a datagraph diagram illustrating embodiments of a product item ordering for the GeoTemp;

FIG. 14 shows a logic flow diagram illustrating embodiments of a location order component for the GeoTemp;

FIG. 15 shows a block diagram illustrating embodiments of the GeoTemp;

FIG. 16 shows a block diagram illustrating embodiments of the GeoTemp;

FIG. 17 shows a block diagram illustrating embodiments of the GeoTemp;

FIG. 18 shows screenshot diagrams illustrating embodiments of the GeoTemp;

FIG. 19 shows a block diagram illustrating embodiments of a GeoTemp controller; and APPENDICES 1-5 illustrate embodiments of the GeoTemp.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Ad Hoc Item Geo Temporal Location and Allocation Apparatuses, Methods and Systems (hereinafter "GeoTemp") transforms user requested area (202), user layout request (1102), user request for product items (1402), layout, section, unit/item position, zone, user item selection inputs, via GeoTemp components (e.g., GeoTemp 1935, GeoTemp Layout Define 1941, item layout 1942, item allocation 1943, map region 1944, map imagery retrieval 1945, location order 1946, product item order component 1947, etc. components), into location map (230), layout position (1135), booking (1026), goods services dispatch (1326, 1430), item reservation, item directions, inventory request, inventory delivery outputs. The GeoTemp components, in various embodiments, implement advantageous features asset forth below.

Introduction

While GPS and mapping solutions exist, they are incapable of accounting for changes that are relatively small in scale both geographically and temporally. For example, if the maps are updated once every 3 years, changes made in between updates are lost.

GeoTemp

FIG. 1 shows a block diagram illustrating user interface embodiments of the GeoTemp. A mobile device 105 may display a map region 110, e.g., Google Maps API call into a display view area, and in the example shown, a zoom in close up area of a beach area. With a selection of, in this case an resort, property a bounding box is drawn along the beach area 115 indicating a potential area of interest to make reservations of beach space. Moving to the next screen, the map screen may be overlaid showing seating layout for the beach area, which is retrieved from a database for that specific locale, and is overlaid on the beach area to illustrate that locations seating capacity and general arrangement 120 within the selections bounding box 115. In one embodiment, colors for the seating arrangement dots may provide feedback for currently occupied seating (e.g., with red colored dots) and those that are available (e.g., green dots) for a given time span, and where a time span scroller widget may be provided to scrub through different times and visually inspect for seating availability. By selecting the seating arrangement bounding box, a user may then bring up the next seating arrangement screen 132, where users can zoom into a particular section of the seating arrangement, e.g., either through the original selection touch area 120 and move further through sections by selecting form the column selection buttons 126. The layout screen can provide feedback of the current area they are looking at 130, and provide search and other options 128, 132 for ordering and finding items of interest. Furthermore, widgets, e.g., a drop-down menu 124, allow the user to see availability for the seating area across time. The user may make one or more selections for seating in the area grid 122 and move on to reserve the seating area(s) for a desired time.

FIG. 2 shows a logic flow diagram illustrating embodiments of a map region component for the GeoTemp. The map region component may be instantiated 201 upon demand, periodically, and/or continuously. In one example embodiment, a user inquiry about a specified area (e.g., tap on a mobile device screen, GPS based current location, etc.) 202 may be the cause for instantiation 201, or may interact with the already instantiated map region component. Also, the component may be instantiated and then operate with no user requested region, and instead, run through a queue of all, e.g., resort, delineated areas for analysis; for example, a list of all resorts may be fed to the map region component as an input map request queue (for example, a list of all US resorts with addresses) and the map region component may continuously process this list refining reserveable areas within such resorts. In one embodiment, the client may provide the following example map region request 202, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<map_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>GeoTemp.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
```

```
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXXZ</client_serial_number>
        <client_UDID>FXXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXXZ</client_serial_number>
        <client_UDID>FXXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <initial_request>
        <map_area>
            <string
                name="lastPosition">someString=</string>
            <int name="deviceTag" value="123456"/>
            <long name="locationReportingIntentTimstamp"
value="123456789"/>
            <float name="lastAccuracy" value="148.0"/>
            <boolean name="locationHistoryEnabled"
value="true"/>
            <long name="lastTimestamp" value="123456789"/>
            <long name="lastIntentProcessedTimestamp"
value="123456789"/>
        </map_area>
        <zoom_level>
            <value_factor>3.4</value_factor>
        </zoom_level>
        <map_date>2014</map_date>
        <reserve_date>2018.12.31</reserve_date>
        <reserve_time>22.30.00</reserve_time>
    </initial_request>
</map_request>
```

Upon receiving the map request 202 from a user client 286, feed of resort areas, etc. for processing at the GeoTemp server 244, the map region component 244, 1944 of FIG. 19 may parse for location, map area region (e.g., region zoom), map date (e.g., for example the year of map satellite imagery used that might have been last viewed and/or cached on the mobile device), etc. and use that to form a request retrieve a map region imagery 203. In one example, the initial map request already described may be reused with an added digital certificate identifying the map region component and forwarding that to a map imagery retrieval component 245, 1945. In one embodiment, the imagery retrieval component may be integrated into the map region component, while in an alternative embodiment, a 3rd party imagery API such as Google Maps API call. The imagery retrieval component 245 may then perform a lookup for the requested area's map imagery 205, and generate and provide the requested imagery as an image frame 207 to the map region component 244, which will receive the image frame data 210. The map region component 244 may then obtain that input representing geospacial features defining a beach region area 215. For example, in one embodiment, for a given location/resort, GPS points circumscribing a region may have been provided (e.g., with measurements from a sight bounding a seating area, a human delineating the bounding region through inspection of a map region and drawing a bounding region providing points for the bounding region, a machine learning engine inspecting beach regions looking for seating and generating a bounding region, etc.). These may be stored in the GeoTemp database and retrieved for a specified region. In one embodiment, the image region datastructure 207, 210, substantially in the form of a HTTP(S) POST message including JSON-formatted data, is provided below:

```
// service area
{
    "id": 5,
    "owner_id": 10,
    "active": true,
    "label": "A",
    "center": {
        "type": "Point",
        "coordinates": [
            -87.0728126877702,
            30.3629073985083
        ]
    },
```

-continued

```
"geo_json": {
  "type": "Polygon",
  "coordinates": [
    [
      [
        -86.8611717224121,
        30.3794654778933
      ],
      [
        -86.8735313415527,
        30.4114479862807
      ],
      [
        -87.2031211853027,
        30.3628778331081
      ],
      [
        -87.2951316833496,
        30.3320647426591
      ],
      [
        -87.2580528259277,
        30.3142835475307
      ],
      [
        -86.8611717224121,
        30.3794654778933
      ]
    ]
  ]
}
```

In one embodiment, the request for map retrieval 203, 205, substantially in the form of PHP/SQL commands is provided below:

```
<?PHP
header('Content-Type: text/plain');
// service areas for coordinates query
SELECT "service_areas".*
FROM "service_areas"
WHERE "service_areas"."deleted" = false
AND "service_areas"."active" = true
AND (ST_Intersects(service_areas.geog,ST_GeographyFromText('SRID=4326;POINT (-84.0 35.0)')))
```

The map region component may then obtain information defining physical product placement within the bound region 220. Similarly to the geospacial bounding region 215, this information may be retrieved as assets from a GeoTemp database and laid out within the geospacial bounding region. In one embodiment, hand tuned asset layout templates may be used, in another embodiment, assets are distributed across the bounding region automatically (e.g., alphabetical order, expense, ranking/weights, etc.). Examples of the physical placement data may be seen in Appendices 1-3.

Upon obtaining the image frame 210, the geospacial bounding region 215 and the assets for the region 220, the map region component may then generate a product layout interface compositing the above 225. In one embodiment, the composite may be generated via Google Maps API with a request for the location coordinates, and placing markers representing the product placements (e.g., where the markers may be custom markers). Alternatively, a composite user interface may be achieved as seen in Appendices 1-3 from the structure (layout.json), as follows:

For each section in the array labeled layout_sections, instruction to draw a section indicator labeled with the attribute layout_section.name is issued. For each position in the array labeled layout_unit_positions with the layout_section array, if the position inventory_unit attribute is populated, an instruction draw a shape determined by the position product.shape attribute (in examples this is either "circle" or "square") or by the position.icon path is issued. In one embodiment, spacing between position elements may be fixed to an amount determined by the client. If the position inventory_unit attribute is not set, this should be taken to be an empty space which should, on screen, take up as much space as a populate position. In one embodiment, maps are rendered using ESRI and its ArcGIS suite, using their imaging library and basemaps, and separately, GeoTemp may render from its data, via Javascript, to HTML and CSS, and overlay that atop ESRI's platform; however, it should be noted that many other mapping APIs and imaging libraries may also be used.

In one embodiment, the client may provide the following example map region request 202, substantially in the form of a HTTP(S) POST message including JSON-formatted data, as provided in Appendix 1. This may be provided to a client device 286 for user interface display 230.

FIG. 3 shows a screenshot diagram illustrating embodiments of a booking for the GeoTemp. A user may interact with GeoTemp. It should be noted that in one embodiment, the user may be an end user wishing to purchase, e.g., resort products, but in an alternative embodiment, the end user may be staff at the resort (e.g., concierge, staff, waiter, etc.) or at a $3^{rd}$ party booking service. A user may select a resort, geographic region, address, etc. initial desired destination 305. GeoTemp may then provide a user with various products available for purchase, rent, etc. for the user's selection(s) 310. For a given selection (e.g., beach set) current availability of various sets may be shown 315 and the user may engage with such a product (e.g., tapping the "+" mark) and then selecting a time range for use of a product 320, 325, and may repeat this for different products and different time spans placing each in a cart 330 for checkout 335 with an option of provide additional notes 340 and obtaining an order receipt visually and by other means (e.g., text, email, etc.) 345, 350. The user may go back to review booked products 355, and tap on a product to view its placement 360 (e.g., this may also be viewed prior to booking), and engage with various options (e.g., viewing order details, moving single item, move a booking, reopen the order, etc.) 365 and review the order 370.

FIGS. 4 and 5 show a screenshot diagram illustrating embodiments of a booking for the GeoTemp. Initially a user may be presented with a login screen 405 (e.g., via mobile application, web browser interface, etc.) and upon providing login credentials 410, may be presented with recent order summaries 415. As already discussed, the suer may begin looking for a play to reserve 420, and in this case, start by reviewing and picking areas for which they would like to reserve product 425, 430, and time ranges 435, 440. They may review their order selections and then add it to the cart 445 and have the cart status reflected on the item (e.g., beach set) reservation chart (e.g., with reserved items in the cart but not yet purchased highlighted visually (e.g., by orange color) for inspection 450. Thereafter they may proceed with order review of the cart 455, provide payment details (e.g., credit card credentials) 460, cash sales 465, 470, and provide purchase details and notes 475. Moving to FIG. 5, the user may provide details about the order (e.g., in this case, a waiter aiding in the dispensing of the products and services may note the particular purchasing customer is a good tipper, which would be saved and reviewable for this order and future orders for the customer) 505. The order may then be executed 510 and receipt options engaged 515. In one embodiment, orders placed may be sorted by order, by destination, and/or other sort option 520, 530. The user may then continue reviewing purchase options, inspect their cart 530, review their reservations locations 535, etc.

FIGS. 6 and 7 show screenshot diagrams illustrating embodiments of a moving orders the GeoTemp. Here a user brings up their current order 605 and selects 607 one of the order items that they wish to move and bring up an options menu 610 and then are allowed to select a new position 620 resulting in the new positioning 625. The user could have also cancelled an order at position B3 if desired 630. Moving to FIG. 7, is a user interface example of a move across a single day, where a user starts with a current order screen for products at a setting 705. The user selects a product (e.g., a beach set at position A8 on the layout grid) 707, and engages the options menu (e.g., by long pressing on the seat, or selecting one of the option menus 708, etc.) and bringing up the order move option menu 710. Upon making a selection for an order move 710, the user is then provided a chart in which they may select a new seating position 720, and then an chart updating the move (e.g., from A8 to A7) 725. Also, the user may cancel a current order, e.g., cancelling the order at B4 730.

FIG. 8 shows a screenshot diagram illustrating embodiments of an online order for the GeoTemp. A user may initially visit a ordering website 805 and search for and select a particular, e.g., resort, location 810. Upon selecting a location, the user may explore information about the location 815, such as beach facilities 820, and explore products and services available at the location 825 (e.g., beach sets, food, activities (e.g., bonfires, para-sailing, jet skiing, surfing, etc.), beverages, etc.) and make selections of interest 830 including date ranges 835, quantity 840, and move on to make further selections of other products 845. If the user does not currently have an account, they may enter their account and payment information 850 or otherwise provide their login credentials 852. Upon supplying their login account information 855 they will also be provided with an order summer 857. The user will also be provided with an interface showing the layout of their product purchases 860 and be provided with the option to make adjustments 865, as has already been discussed. An order receipt may then be displayed 870.

FIG. 9 shows a screenshot diagram illustrating embodiments to reopen an order for the GeoTemp. Here examines their current order at the layout screen 905 and selected an option menu 910 to reopen and order, and in this case the user may delete various orders A8 920 or B4 925, or otherwise move or edit their order as has already been discussed.

FIG. 10 shows a datagraph diagram illustrating embodiments of a layout booking for the GeoTemp. Initially, a user may engage with an ordering device (e.g., a mobile device, a point of sale terminal, a computer, etc.) 1010 having loaded the GeoTemp user interface (as has already been discussed in previous user interface Figures). The user device may then issue a position booking request 1021 to a GeoTemp server 1035. In one embodiment, the client may provide the following example position booking request 1021, substantially in the form of a HTTP(S) POST message including JSON-formatted data, as provided below:

```
{
    "order_token": "9838d30de9751a18527fe38263979e36",
    "bookings": [
        {
            "event_instance_ids": [
                425456,
                425457,
                425458,
                425459,
                425460
            ],
            "layout_unit_position_id": "26828",
            "inventory_unit_id": [
                "3"
            ]
        },
        {
            "event_instance_ids": [
                425456,
                425457,
                425458,
                425459,
                425460
            ],
            "layout_unit_position_id": "26829",
            "inventory_unit_id": [
                "4"
            ]
        }
    ],
    "destination_id": 3,
    "product_id": 3
}
```

Upon obtaining the position booking request message 1021, the GeoTemp server 1035 may provide the message for processing to a location order component (e.g., See FIGS. 11 and 1946 of FIG. 19). The GeoTemp server 1035 will then generate and provide a product layout request 1022 to the map imagery retrieval component 1045, 245 of FIG. 2, 1945 of FIG. 19 and/or GeoTemp database 1919 of FIG. 19. In one embodiment, the client may provide the following example Product bookings on layout request 1022, substantially in the form of PHP/SQL commands as provided below:

A product bookings on layout request:

```
<?PHP
header('Content-Type: text/plain');
// bookings_on
SELECT
    *
FROM (
    SELECT
        event_instances.id AS event_instance_id,
        event_instances.starts_at AS starts_at,
        event_instances.ends_at AS ends_at,
        products.id AS product_id,
        inventory_units.id AS inventory_unit_id,
        layouts.id AS layout_id,
        layout_sections.name AS section_name,
        layout_unit_positions.id AS layout_unit_position_id,
        layout_unit_positions.position_y AS unit_y,
```

-continued

```
    layout_sections.position_x AS section_x,
    layout_unit_positions.position_x AS unit_x
FROM inventory_units
JOIN products
    ON products.id = inventory_units.product_id
JOIN schedules
    ON schedules.schedulable_type = 'Beachy::Model::Product'
    AND schedules.schedulable_id = products.id
JOIN events
    ON events.schedule_id = schedules.id
    AND events.deleted = false
JOIN event_instances
    ON event_instances.event_id = events.id
    AND event_instances.deleted = false
JOIN mapped_areas
    ON mapped_areas.destination_id = ?
JOIN layouts
    ON layouts.mapped_area_id = mapped_areas.id
JOIN layout_sections
    ON layout_sections.layout_id = layouts.id
    AND layout_sections.id IS NOT NULL
JOIN layout_unit_positions
    ON layout_unit_positions.layout_section_id = layout_sections.id
    AND layout_unit_positions.inventory_unit_id =
    inventory_units.id
WHERE products.id = ?
    AND inventory_units.deleted = false
    AND event_instances.id IN (?)
    AND inventory_units.id NOT IN (?)
    AND (
        event_instances.starts_at
            BETWEEN layouts.active_on
            AND (layouts.active_on + interval '1 day' – interval
            '1 second')
    )
    AND date_trunc('day', event_instances.starts_at) =
date_trunc('day', layouts.active_on)
    %s
    AND inventory_units.id NOT IN (
        SELECT inventory_unit_id
        FROM rental_periods
        WHERE
            rental_periods.event_instance_id = event_instances.id AND
            rental_periods.deleted = false AND
            rental_periods.state IN ('reserved', 'active')
    )
    ORDER BY unit_y, section_x, unit_x, event_instance_id
) q
LIMIT %s
?>
```

Or a bookings off layout request:

```
<?PHP
header('Content-Type: text/plain');
// bookings_off
SELECT
    event_instances.id AS event_instance_id,
    event_instances.starts_at AS starts_at,
    event_instances.ends_at AS ends_at,
    products.id AS product_id,
    inventory_units.id AS inventory_unit_id
FROM inventory_units
JOIN products
    ON products.id = inventory_units.product_id
JOIN schedules
    ON schedules.schedulable_type = 'Beachy::Model::Product'
    AND schedules.schedulable_id = products.id
JOIN events
    ON events.schedule_id = schedules.id
    AND events.deleted = false
JOIN event_instances
    ON event_instances.event_id = events.id
    AND event_instances.deleted = false
WHERE products.id = ?
    AND event_instances.id IN (?)
    AND inventory_units.deleted = false
    AND inventory_units.id NOT IN (?)
    %s
    AND inventory_units.id NOT IN (
        SELECT inventory_unit_id
        FROM rental_periods
        WHERE
            rental_periods.event_instance_id = event_instances.id AND
            rental_periods.deleted = false AND
            rental_periods.state IN ('reserved', 'active')
    )
    ORDER BY event_instances.starts_at, inventory_unit_id
?>
```

The map imagery retrieval component 1045 may then return layout data 1023 for the user's 1010 layout booking request 1021 to the GeoTemp server 1035, substantially in the form of a HTTP(S) POST message including JSON-formatted data, as provided in Appendix 2, which may be further provided back to the user device 1010, 1024 for further display and user interface and booking interaction(s) and/or product selection(s); or alternatively may be processed with product updates for the return layout 1024, substantially in the form of a HTTP(S) POST message including JSON-formatted data, as provided in Appendix 3. Upon obtaining further user interface selections as already discussed in previous user interface figures, the user device 1010 may then provide a product booking request 1025 to the GeoTemp server 1035, substantially in the form of a HTTP(S) POST message including JSON-formatted data, as provided in Appendix 4. The GeoTemp server may then use the product booking request 1025 to effect storing the booking of product, substantially in the form of PHP/SQL commands as provided below:

```
<?PHP
header('Content-Type: text/plain');
// bookings for unit position
SELECT
DISTINCT ON (event_instance_id)
*
FROM
(
    SELECT
        rental_periods.id AS rental_period_id,
        event_instances.id AS event_instance_id,
        event_instances.starts_at AS starts_at,
        event_instances.ends_at AS ends_at,
        products.id AS product_id,
        inventory_units.id AS inventory_unit_id,
        layouts.id AS layout_id,
        layout_sections.name AS section_name,
        layout_unit_positions.id AS layout_unit_position_id,
        layout_sections.position_x AS section_x,
        layout_unit_positions.position_y AS unit_y,
        layout_unit_positions.position_x AS unit_x
    FROM layout_unit_positions
    JOIN layout_sections ON layout_sections.id =
layout_unit_positions.layout_section_id
    JOIN layouts ON layouts.id = layout_sections.layout_id
    JOIN inventory_units
        ON inventory_units.id = layout_unit_positions.inventory_unit_id
        AND inventory_units.deleted = false
    JOIN products ON products.id = inventory_units.product_id
    JOIN schedules
        ON schedules.schedulable_type = 'Beachy::Model::Product'
        AND schedules.schedulable_id = products.id
    JOIN events
        ON events.schedule_id = schedules.id
        AND events.deleted = false
    JOIN event_instances
        ON event_instances.event_id = events.id
        AND event_instances.deleted = false
```

```
        JOIN mapped_areas ON layouts.mapped_area_id = mapped_areas.id
            AND mapped_areas.destination_id = ?
        LEFT JOIN rental_periods ON rental_periods.-
    layout_unit_position_id = layout_unit_positions.id
            AND rental_periods.event_instance_id = event_instances.id
            AND rental_periods.state IN ('reserved', 'active')
            AND rental_periods.deleted = false
        WHERE
            event_instances.id IN (?)
            AND layout_sections.position_x = ?
            AND layout_unit_positions.position_x = ?
            AND layout_unit_positions.position_y = ?
            AND (
                event_instances.starts_at
                    BETWEEN layouts.active_on
                    AND (layouts.active_on + interval '1 day' - interval
                        '1 second')
            )
            AND date_trunc('day', event_instances.starts_at) =
    date_trunc('day', layouts.active_on)
    ) q
    WHERE rental_period_id IS NULL
    ?>
```

FIG. 11 shows a logic flow diagram illustrating embodiments of a location order component for the GeoTemp. The location order component may be instantiated 1101 upon demand, periodically, and/or continuously. In one example embodiment, a user 1186 layout request 1102 (e.g., see 1021 of FIG. 10) may be received by the location order component on the GeoTemp server 1144, which may then generate a query for layout position booking 1103 (e.g., see 1022 of FIG. 10), and the map region component 1145, 1945 of FIG. 19 may retrieve the requested query results. The layout may then be retrieved 1105 and prepared to be provided as a user interface layout for further selections 1107 (e.g., see 1023 of FIG. 10), and the GeoTemp server 1144 may then provide the interface to the user 1110 (e.g., see 1024 of FIG. 10) for display and interaction 1115 on the client device 1186 where the user may then make further product selections 1120 (e.g., see FIGS. 1, 3-9). These selections and booking requests are confirmed to be available 1125 when provided to the GeoTemp server 1144 and confirmed (e.g., See 1025 of FIG. 10) 1130. If the bookings are not available 1125, flow may commence to an error handler, terminate, and/or restart the process 1101. Upon confirmation 1130, the customer requested positions may be assigned and then stored at the server 1135 (e.g., see 1026 of FIG. 10).

FIG. 12 shows a screenshot diagram illustrating embodiments of item product ordering an order for the GeoTemp. The user may make a selection for a seating section 1205 area and select their seats 1210 and/or interact with already reserved seating; e.g., the user may reopen their order as already discussed and/or otherwise interact with their location purchase order as has already been discussed in earlier user interface figures. Once a seating area has been obtained, the user may bring up options for reserved seating and order additional goods and/or services for those reserved seats, e.g., for drinks 1215, 1220, and or other services through selections, including the times of delivery of such goods and services.

FIG. 13 shows a datagraph diagram illustrating embodiments of a product item ordering for the GeoTemp. Initially, a user may engage with an ordering device (e.g., a mobile device, a point of sale terminal, a computer, etc.) 1310 having loaded the GeoTemp user interface (as has already been discussed in previous user interface Figures, e.g., FIG. 12). The user device 1310 provides a user input device location request for items available for the location 1321 to a product items order component (e.g., see FIG. 14 for more detail) instantiated on the GeoTemp server 1335 receives the request and makes a product items request for the position 1322 to the map imagery retrieval component 1345, 245 of FIG. 2, 1945 of FIG. 19, which may then return available product items for the requested (e.g., seating) position 1323 back to the GeoTemp server 1335, which may then provide a user interface for product item selections 1324 back to the user device 1310. In one embodiment this may take a form similar to what was already discussed for layout selection 1021, 1035, 1022, 1023, 1024. In another embodiment, layout information is already established, and instead a refined user position request 1321 is provided to the GeoTemp server 1335, substantially in the form of a HTTP(S) POST message including JSON-formatted data, as provided below:

```
{
    "customer_i": 1,
    "layout_i": 1,
    "layout_section_i": 1,
    "position_i": 1
}
```

This position layout information may be provided as a product items request for the specified position 1322, substantially in the same form 1321 and whereby a query for the location and product availability at the location is made 1322 (e.g., see query at 1022 of FIG. 10). In one embodiment, the query for retrieval of the product request for a given position 1321, substantially in the form of PHP/SQL commands is provided below:

```
SELECT
    owner_id,
    category_id || '-' || case is_rental when true then 1 else 0 end AS
    "key", array_to_string(array_agg(product_id), ',') AS
    product_ids
FROM (
    SELECT
        t.product_id,
        t.category_id,
        t.owner_id,
        t.distance,
        t.is_rental,
        CASE t.is_rental
            WHEN true
                THEN (inventory_unit_count * event_instance_count) -
                    rental_period_count
            ELSE
                inventory_unit_count
        END AS availability
    FROM (
        SELECT
            products.id AS product_id,
            products.category_id,
            products.is_rental,
            owners.id AS owner_id,
            COUNT(DISTINCT inventory_units.id) AS
            inventory_unit_count,
            COUNT(DISTINCT event_instances.id) AS
            event_instance_count,
            COUNT(DISTINCT rental_periods.id) AS rental_period_count,
            ST_Distance(
                ST_GeomFromText(?, 4326),
                service_areas.center::geometry
            ) AS distance
        FROM
            service_areas
            JOIN owners
                ON owners.id = service_areas.owner_id
                AND owners.deleted = false
```

-continued

```
        JOIN products
          ON products.owner_id = owners.id
          AND products.deleted = false
        JOIN categories
          ON categories.id = products.category_id
        JOIN inventory_units
          ON inventory_units.product_id = products.id
          AND inventory_units.deleted = false
        LEFT OUTER JOIN schedules
          ON schedules.schedulable_type = 'Beachy::Model::Product'
          AND schedules.deleted = false
          AND schedules.schedulable_id = products.id
          AND products.is_rental IS true
        LEFT OUTER JOIN events
          ON events.schedule_id = schedules.id
          AND events.deleted = false
        LEFT OUTER JOIN event_instances
          ON event_instances.event_id = events.id
          AND event_instances.deleted = false
          AND products.is_rental IS true
          AND event_instances.starts_at >= ?
          AND event_instances.ends_at <= ?
        LEFT OUTER JOIN rental_periods
          ON rental_periods.inventory_unit_id = inventory_units.id
          AND rental_periods.deleted = false
          AND rental_periods.event_instance_id = event_instances.id
          AND rental_periods.state != 'new'
        WHERE
          service_areas.deleted = false
          AND service_areas.id IN (?)
        GROUP BY
          products. id,
          products.category_id,
          owners.id,
          service_areas.center
        HAVING
          CASE products.is_rental
          WHEN true
            THEN (
              COUNT(DISTINCT inventory_units.id) *
              COUNT(DISTINCT event_instances.id)
            ) - COUNT(DISTINCT rental_periods.id)
          ELSE
            COUNT(DISTINCT inventory_units.id)
          END > 0
        ) t
      ORDER BY distance ASC
    ) t2
    GROUP BY
      owner_id,
      category_id,
      is_rental,
      distance
    ORDER BY distance ASC
```

In one embodiment, the query for retrieval of the product request for a given position 1321, substantially in the form of Ruby commands is provided below:

```
# frozen_string_literal: true
require 'beachy/queries/generic_query'
module Beachy
  module Queries
    class ServiceAreaProductsQuery < GenericQuery
      default_relation ServiceArea
      # What this query does:
      #
      # For the given parameters (service_areas, date range, origin)
      #
      # 1. Find the owners within the service areas with +will_deliver+
      #    set to true.
      # 2. Find the products belonging to those owners, grouped by
      #    category so that no two products in the same category from
      #    different owners is returned. The caveat here is if, given two
      #    products from different owners one is for rent and the other
      #    for sale, then both will be returned.
      # 3. Only return products with availability during the given date
      #    range.
      # 4. Order owner products by distance from the given origin so
      #    that
      #    the owner closest to the user is afforded priority.
      QUERY = load_sql('service_area_products').freeze
      def find_each(service_areas, lat, lng, start_date, end_date)
        ids = service_areas.map(&:id)
        point = Geography.fetch_point(lat, lng)
        result = execute(QUERY, point, start_date, end_date, ids).to_a
        select_products(result)
      end
      private
      def select_products(result)
        keys = Set.new
        result.flat_map do |row|
          next unless keys.add?(row['key'])
          Product.find(row['product_ids'])
        end.compact
      end
    end
  end
end
```

The available product items for the position response 1323 may then result from the query, substantially in the form of a HTTP(S) POST message including JSON-formatted data, as provided below:

```
[
  {
    "product_id": 1,
    "vendor_id": 1,
    "name": "Old Fashioned",
    "price": {
      "cents": 1200,
      "fractional": 1200,
      "symbol": "$",
      "currency": {
        "iso_code": "USD",
        "subunit": "Cent",
        "subunit_to_unit": 100,
        "thousands_separator": ",",
        "decimal_mark": "."
      }
    }
  },
  {
    "product_id": 2,
    "vendor_id": 2,
    "name": "Sunscreen",
    "price": {
      "cents": 800,
      "fractional": 800,
      "symbol": "$",
      "currency": {
        "iso_code": "USD",
        "subunit": "Cent",
        "subunit_to_unit": 100,
        "thousands_separator": ",",
        "decimal_mark": "."
      }
    }
  }
]
```

In an alternative embodiment, the above 1323 response may be reformatted and composited into a return user interface as has already been discussed 1024 of FIG. 10. As such the provided user interface of products available for selections for the seating location 1324 are provided to the user device 1310 where the user makes selections for desired items 1325, substantially in the form of a HTTP(S) POST message including JSON-formatted data, as provided below:

```
{
    "order_token": "59ba1d19858d4f7b23aa3bbae1ed9671",
    "products": [
        {
            "position_id":  1,
            "product_id":   1,
            "quantity":     1
        },
        {
            "position_id":  1,
            "product_id":   2,
            "quantity":     1
        }
    ]
}
```

The selection request 1325 may be forwarded 1326a, 1326b to product vendor(s)' system(s) 1351a, 1351b. In one embodiment, the greater textual information of the order may be provided for the user selections 1325 when the vendor's system has not be configured to work with GeoTemp. In one embodiment, the order may be sent via SMS, email, direct to application, etc. In another embodiment, the vendors' systems are configured to take the selections input 1325 directly. In yet another embodiment, an identifier to the customer identifier and/or order identifier is provided so that each vendor may separately charge the customer for selected items. In one embodiment, the order datastructure 1325, 1326a, 1326b, substantially in the form of a HTTP(S) POST message including JSON-formatted data, is provided in Appendix 5.

FIG. 14 shows a logic flow diagram illustrating embodiments of a location order component for the GeoTemp. The location order component may be instantiated 1401 upon demand, periodically, and/or continuously. In one example embodiment, a user 1486 request for product items available for their location position 1402 (e.g., see 1321 of FIG. 13) may be received by the location order component on the GeoTemp server 1444, which may then generate a query for layout position booking 1403 (e.g., see 1322 of FIG. 13), and the map region component 1445, 1945 of FIG. 19 may retrieve the requested query results. In one embodiment this may be achieved based on user input and location data via a query 1322 of FIG. 13. The query results of the product items available for the location position 1405 may then be retrieved 1405 and prepared to be provided as a user interface layout for further selections 1407 (e.g., see 1323 of FIG. 13), and the GeoTemp server 1444 may then provide the interface to the user 1410 (e.g., see 1324 of FIG. 13) for display and interaction 1415 on the client device 1486 where the user may then make further product selections 1420 (e.g., see FIGS. 12, 1, 3-9). These selections for item requests 1420 are then provided 1125 to the GeoTemp server 1444, where the GeoTemp server 1144 confirms availability of the goods and services requested (e.g., See 1323, 1326a, 1326b of FIG. 13) 1427. Upon confirmation 1427, the customer requested product items may be sent as orders to outside vendors for fulfillment 1430 (e.g., see 1351a, 1351b of FIG. 13).

FIG. 15 shows a block diagram illustrating embodiments of the GeoTemp. FIG. 15 shows a Beach Type Definition 1501:
   1) Municipality
      59.1. a. Congested
      59.2. b. Uncongested
   2) Private Residence
   3) Resort/Community
      61.1. a. Non-partner
      61.2. b. Unmanaged
      61.3. c. Managed FIG. 15 goes on to show Seating Layout Definition (ALL Beach Types) 1550:
   A: Resort/Beach Owner
      63.1. b1: Access 1
      63.2. b2: Access 2
      63.3. x,y: Grid Area FIG. 16 shows a block diagram illustrating embodiments of the GeoTemp. FIG. 16 shows a Seat Selection (ALL Accessible Beach Types) 1601:
   64.1. a: Seating available for booking on device
   64.2. b: Seating display corresponds to availability (can change by date/time) c: Seating is displayed on device
   64.3. d: Seats (a) map to grid position
   64.4. e: Seating layout maps to grid FIG. 16 shows a Vendor Dispatch (ALL Accessible Beach Types) 1650:
   65.1. a: Products available for sale
   65.2. b: Products are displayed on device
   65.3. c: At purchase, vendor is selected
   65.4. d: Vendor is dispatched to grid position e: Mapped landmarks inform directions f: GPS provides accuracy to directions FIG. 17 shows a block diagram illustrating embodiments of the GeoTemp. FIG. 17 shows a Camera Guidance (Accessible but Unmanaged Beaches) 1701:
   66.1. 1) Seating layout displayed from statistically driven model
   66.2. 2) Further guidance given by "context pic" as seen above FIG. 17 shows a beach area for GeoTemp layout 1720. GeoTemp layout establishes datastructures that allow for object map placement, inventory allocation, temporal allocation, etc. It includes the following mechanisms.

Mechanism for Defining Serviceable Beach Area 1. draw bounds of beach from water line (or regulatory line) to property boundary
2. determine associated property owner and/or contracted service provider
3. mark access point coordinates and access type (public, restricted)

Defining Beach Layout

Given the variables
   71.1. seating type and size
   71.2. available beach area
   71.3. geographic area
   71.4. date
   71.5. beach seating history
   71.6. related beach seating history GeoTemp defines the number of sections into which the beach area should be subdivided, the count of seating inventory to be allocated to each section and the position of each seat to be placed within. The configuration of seating positions will change based on seasonality and past performance. Any type of placeable product can be contained within a seating position, thus a layout can contain different seating types. The hierarchical structure of this definition includes:
   Layout—Defines the serviceable beach area
      Section—Defines an area comprising grouping of seating positions Position—Defines an area within which to place a seat of some type Zone—Defines an area within a section comprising some number of positions, indicative of higher or lower demand and/or desirability Examples include and are illustrated 1750:

73.1. Given a beach area of 100 meters by 30 meters
73.2. And a seating type that covers 10 square meters, including space between
73.3. And a geographic area being northwest Florida
73.4. And a date during peak season
73.5. Then we determine the optimal arrangement being 2 sections of 15 positions
73.6. And the number of rows per section is 3
73.7. And the number of columns per row is 5
73.8. And the total number of positions is 30
73.9. Given a beach area of 100 meters by 30 meters
73.10. And a seating type that covers 10 square meters, including space between
73.11. And a geographic area being northwest Florida
73.12. And prior beach history for this date expects low demand
73.13. Then we determine the optimal arrangement being 2 sections of 10 positions
73.14. And the number of rows per section is 2
73.15. And the number of columns per row is 5
73.16. And the total number of positions is 20

Selecting a Seating Position

FIG. 18 shows screenshot diagrams illustrating embodiments of the GeoTemp.

An interface for selecting a seat 1801, 1820 from the definition above is provided to the consumer. A related point-of-sale interface is provided to vendors. This interface is dynamic, meaning that it changes over time to reflect the seating layout and availability and corresponds one to one with the definition above. This interface allows for booking any number of seating positions for any number of units of time as defined by the seating type's availability.

Seating positions are color-coded to provide an indication of that position's availability to the user. The color-coded states include:

76.1. 1. unavailable for the date/time range desired
76.2. 2. available for the entirety of the date/time range desired
76.3. 3. Available for part, but not the entirety, of the date/time range desired Upon a user booking a seating position during a date/time range, that position is marked in the system as unavailable for booking.

Ordering Products to a Seating Position

FIG. 18 shows product item (e.g., from available inventory) ordering interfaces 1840, 1860. A system and interface allows users to order products from vendors to be delivered to a seating position is provided. Users are able to browse and order products from this interface. Products are displayed to users based in whole or part on the following variables.

78.1. ● Distance from the vendor dispatch point to the user's seating position
78.2. ● Vendor inventory count
78.3. ● Vendor customer service rating
78.4. ● Vendor server or driver availability Delivering Products to a Seating Position Post-purchase, a notification to the vendor indicating the need for product delivery is sent. Directions to the point of address or property are provided by a third-party direction provider (e.g. Google Maps, Apple Maps, etc.). Beyond this point, directions are informed by our mapping, defined landmarks (e.g. beach access point, booked seating position) and the customer's device sensors, if available.

Example GeoTemp Datastructures

In one embodiment, the client may provide the following example layout message, substantially in the form of a HTTP(S) POST message including JSON-formatted data, as provided below:

| property | type | desc |
| --- | --- | --- |
| id | Integer | The primary key of the layout |
| destination_id | Integer | The ID of the destination for this layout |
| destination | DestinationEntity | The destination applicable for this layout |
| ocean_direction | String | The ocean facing direction of this layout |
| destination_direction | String | The destination facing direction for this layout |
| default | boolean | The default layout for this destination |

An example layout datastructure follows:

```
{
  "id": 1,
  "destination_id": 1,
  "destination": {
    "id": 1,
    "owner_id": 1,
    "destination_type": "string",
    "name": "string",
    "slug": "string",
    "description": "string",
    "lat": 1.0,
    "lng": 1.0,
    "city": "string",
    "state_name": "string",
    "image_path": "string",
    "image_url": "string",
    "active": true,
    "distance": 1,
    "owner": {
      "id": 1,
      "name": "string",
      "image_path": "string",
      "image_url": "string",
      "address": "string",
      "pusher_channel_name": "string",
      "opens_at": "string",
      "closes_at": "string",
      "created_at": "2016-07-08T15:36:40+00:00",
      "updated_at": "2016-07-08T15:36:40+00:00"
    },
    "meta": {
    },
    "time_zone": {
      "name": "string"
    },
    "address": {
      "id": 1,
      "user_id": 1,
      "address_type": "string",
```

```
                "first_name": "string",
                "last_name": "string",
                "address1": "string",
                "address2": "string",
                "city": "string",
                "state_name": "string",
                "zip_code": "string",
                "country": "string",
                "phone": "string",
                "created_at": "2016-07-08T15:36:40+00:00"
            }
        },
        "ocean_direction": "string",
        "destination_direction": "string",
        "default": true
    }
}
```

A LayoutUnitPosition message may include the following:

```
{
    "id": 1,
    "position_x": 1,
    "position_y": 1,
    "layout_section_id": 1,
    "layout_section": {
        "id": 1,
        "layout_id": 1,
        "layout": {
            "id": 1,
            "destination_id": 1,
            "destination": {
                "id": 1,
                "owner_id": 1,
                "destination_type": "string",
                "name": "string",
                "slug": "string",
                "description": "string",
                "lat": 1.0,
                "lng": 1.0,
                "city": "string",
                "state_name": "string",
                "image_path": "string",
                "image_url": "string",
                "active": true,
                "distance": 1,
                "owner": {
                    "id": 1,
                    "name": "string",
                    "image_path": "string",
                    "image_url": "string",
                    "address": "string",
                    "pusher_channel_name": "string",
                    "opens_at": "string",
                    "closes_at": "string",
                    "created_at": "2016-07-08T15:36:40+00:00",
                    "updated_at": "2016-07-08T15:36:40+00:00"
                },
                "meta": {
                },
                "time_zone": {
                    "name": "string"
                },
                "address": {
                    "id": 1,
                    "user_id": 1,
                    "address_type": "string",
                    "first_name": "string",
                    "last_name": "string",
                    "address1": "string",
                    "address2": "string",
                    "city": "string",
                    "state_name": "string",
                    "zip_code": "string",
                    "country": "string",
```

```
                    "phone": "string",
                    "created_at": "2016-07-08T15:36:40+00:00"
                }
            },
            "ocean_direction": "string",
            "destination_direction": "string",
            "default": true
        },
    "row_number": 1
    }
}
```

A LayoutZon message may include the following:

| property | type | desc |
| --- | --- | --- |
| id | Integer | The primary key of the layout zone |
| layout_section_id | Integer | The ID of the layout section for this zone |
| layout_section | LayoutSectionEntity | The layout section applicable to this zone |
| zone_type | String | The type of zone |
| top_left_corner | object | The coordinates of the top left corner of the bounding box for this zone |
| bottom_right_corner | object | The coordinates of the bottom right corner of the bounding box for this zone |

An example layout zone datastructure follows:

```
{
    "id": 1,
    "layout_section_id": 1,
    "layout_section": {
        "id": 1,
        "layout_id": 1,
        "layout": {
            "id": 1,
            "destination_id": 1,
            "destination": {
                "id": 1,
                "owner_id": 1,
                "destination_type": "string",
                "name": "string",
                "slug": "string",
                "description": "string",
                "lat": 1.0,
                "lng": 1.0,
                "city": "string",
                "state_name": "string",
                "image_path": "string",
                "image_url": "string",
                "active": true,
                "distance": 1,
                "owner": {
                    "id": 1,
                    "name": "string",
                    "image_path": "string",
                    "image_url": "string",
                    "address": "string",
                    "pusher_channel_name": "string",
                    "opens_at": "string",
                    "closes_at": "string",
                    "created_at": "2016-07-08T15:36:40+00:00",
                    "updated_at": "2016-07-08T15:36:40+00:00"
                },
                "meta": {
                },
                "time_zone": {
                    "name": "string"
                },
```

-continued

```
    "address": {
        "id": 1,
        "user_id": 1,
        "address_type": "string",
        "first_name": "string",
        "last_name": "string",
        "address1": "string",
        "address2": "string",
        "city": "string",
        "state_name": "string",
        "zip_code": "string",
        "country": "string",
        "phone": "string",
        "created_at": "2016-07-08T15:36:40+00:00"
      }
    },
    "ocean_direction": "string",
    "destination_direction": "string",
    "default": true
  },
  "row_number": 1
},
"zone_type": "string",
"top_left_corner": {
},
"bottom_right_corner": {
}
}
```

GeoTemp Controller

FIG. 19 shows a block diagram illustrating embodiments of a GeoTemp controller. In this embodiment, the GeoTemp controller 1901 may serve to aggregate, process, store, search, serve, identify, instruct, generate, match, and/or facilitate interactions with a computer through geo-location and inventory allocation technologies, and/or other related data.

Typically, users, which may be people and/or other systems, may engage information technology systems (e.g., computers) to facilitate information processing. In turn, computers employ processors to process information; such processors 1903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the GeoTemp controller 1901 may be connected to and/or communicate with entities such as, but not limited to: one or more users from peripheral devices 1912 (e.g., user input devices 1911); an optional cryptographic processor device 1928; and/or a communications network 1913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The GeoTemp controller 1901 may be based on computer systems that may comprise, but are not limited to, components such as: a computer systemization 1902 connected to memory 1929.

Computer Systemization

A computer systemization 1902 may comprise a clock 1930, central processing unit ("CPU(s)" and/or "processor(s)" (these terms are used interchangeable throughout the disclosure unless noted to the contrary)) 1903, a memory 1929 (e.g., a read only memory (ROM) 1906, a random access memory (RAM) 1905, etc.), and/or an interface bus 1907, and most frequently, although not necessarily, are all interconnected and/or communicating through a system bus 1904 on one or more (mother)board(s) 1902 having conductive and/or otherwise transportive circuit pathways through which instructions (e.g., binary encoded signals) may travel to effectuate communications, operations, storage, etc. The computer systemization may be connected to a power source 1986; e.g., optionally the power source may be internal. Optionally, a cryptographic processor 1926 may be connected to the system bus. In another embodiment, the cryptographic processor, transceivers (e.g., ICs) 1974, and/or sensor array (e.g., accelerometer, altimeter, ambient light, barometer, global positioning system (GPS) (thereby allowing GeoTemp controller to determine its location), gyroscope, magnetometer, pedometer, proximity, ultra-violet sensor, etc.) 1973 may be connected as either internal and/or external peripheral devices 1912 via the interface bus I/O 1908 (not pictured) and/or directly via the interface bus 1907. In turn, the transceivers may be connected to antenna(s) 1975, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the GeoTemp controller and beyond through various interfaces. Should processing requirements dictate a greater amount speed and/or capacity, distributed processors (e.g., see Distributed GeoTemp below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the GeoTemp may be achieved by implementing a microcontroller such as CAST's R8051XC2 microcontroller; Intel's MCS 51 (i.e., 8051 microcontroller); and/or the like. Also, to implement certain features of the GeoTemp, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the GeoTemp component collection (distributed or otherwise) and/or features may be implemented via the microprocessor and/or via embedded components; e.g., via ASIC, coprocessor, DSP, FPGA, and/or the like. Alternately, some implementations of the GeoTemp may be implemented with embedded components that are configured and used to achieve a variety of features or signal processing.

Depending on the particular implementation, the embedded components may include software solutions, hardware solutions, and/or some combination of both hardware/software solutions. For example, GeoTemp features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the GeoTemp features. A hierarchy of programmable interconnects allow logic blocks to be interconnected as needed by the GeoTemp system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the GeoTemp may be developed on regular FPGAs and then migrated into a fixed version that more resembles ASIC implementations. Alternate or coordinating implementations may migrate GeoTemp controller features to a final ASIC instead of or in addition to FPGAs. Depending on the implementation all of the aforementioned embedded components and microprocessors may be considered the "CPU" and/or "processor" for the GeoTemp.

Power Source

The power source 1986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1986 is connected to at least one of the interconnected subsequent components of the GeoTemp thereby providing an electric current to all subsequent components. In one example, the power source 1986 is connected to the system bus component 1904. In an alternative embodiment, an outside power source 1986 is provided through a connection across the I/O 1908 interface. For example, a USB and/or IEEE 1394 connection carries both data and power across the connection and is therefore a suitable source of power.

Interface Adapters

Interface bus(ses) 1907 may accept, connect, and/or communicate to a number of interface adapters, conventionally although not necessarily in the form of adapter cards, such as but not limited to: input output interfaces (I/O) 1908, storage interfaces 1909, network interfaces 1910, and/or the like. Optionally, cryptographic processor interfaces 1927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1909 may accept, communicate, and/or connect to a number of storage devices such as, but not limited to: storage devices 1914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1910 may accept, communicate, and/or connect to a communications network 1913. Through a communications network 1913, the GeoTemp controller is accessible through remote clients 1933b (e.g., computers with web browsers) by users 1933a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed GeoTemp below), architectures may similarly be employed to pool, load balance, and/or otherwise decrease/increase the communicative bandwidth required by the GeoTemp controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1910 may be used to engage with various communications network types 1913. For example, multiple network interfaces may be employed to allow for the communication over broadcast, multicast, and/or unicast networks.

Input Output interfaces (I/O) 1908 may accept, communicate, and/or connect to user, peripheral devices 1912 (e.g., input devices 1911), cryptographic processor devices 1928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 1912 may be connected and/or communicate to I/O and/or other facilities of the like such as network interfaces, storage interfaces, directly to the interface bus, system bus, the CPU, and/or the like. Peripheral devices may be external, internal and/or part of the GeoTemp controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1911 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the GeoTemp controller may be embodied as an embedded, dedicated, and/or monitor-less (i.e., headless) device, wherein access would be provided over a network interface connection.

Cryptographic units such as, but not limited to, microcontrollers, processors 1926, interfaces 1927, and/or devices 1928 may be attached, and/or communicate with the GeoTemp controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1929. However, memory is a fungible technology and resource, thus, any number of memory embodiments may be employed in lieu of or in concert with one another. It is to be understood that the GeoTemp controller and/or a computer systemization may employ various forms of memory 1929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1929 will include ROM 1906, RAM 1905, and a storage device 1914. A storage device 1914 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1929 may contain a collection of program and/or database components and/or data such as, but not limited to: operating system component(s) 1915 (operating system); information server component(s) 1916 (information server); user interface component(s) 1917 (user interface); Web browser component(s) 1918 (Web browser); database(s) 1919; mail server component(s) 1921; mail client component(s) 1922; cryptographic server component(s) 1920 (cryptographic server); the GeoTemp component(s) 1935; the GeoTemp component 1935 including the following components: GeoTemp Layout Define 1941 (e.g., see FIGS. 15, 16), item layout component 1942 (e.g., see FIGS. 15, 16, etc.), item allocation component 1943 (e.g., see FIGS. 16, 17, 18, etc.), map region component 1944 (e.g., see FIG. 2, etc.), map imagery retrieval component 1945 (e.g., See FIG. 2, etc.), location order component 1946 (e.g., see FIG. 11, etc.), product item order component 1947 (e.g., see FIG. 14, etc.), and/or the like (i.e., collectively a component collection). These components may be stored and accessed from the storage devices and/or from storage devices accessible through an interface bus. Although non-conventional program components such as those in the component collection, typically, are stored in a local storage device 1914, they may also be loaded and/or stored in memory such as: peripheral devices, RAM, remote storage facilities through a communications network, ROM, various forms of memory, and/or the like.

Operating System

The operating system component 1915 is an executable program component facilitating the operation of the GeoTemp controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Blackberry's QNX; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the GeoTemp controller to communicate with other entities through a communications network 1913. Various communication protocols may be used by the GeoTemp controller as a subcarrier transport mechanism for interaction, such as, but not limited to: multicast, TCP/IP, UDP, unicast, and/or the like.

Information Server

An information server component 1916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the GeoTemp controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the GeoTemp database 1919, operating systems, other program components, user interfaces, Web browsers, and/or the like.

Access to the GeoTemp database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the GeoTemp. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the GeoTemp as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1918 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the GeoTemp enabled nodes. The combined application may be nugatory on systems employing standard Web browsers.

Mail Server

A mail server component 1921 is a stored program component that is executed by a CPU 1903. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the GeoTemp. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the GeoTemp mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1922 is a stored program component that is executed by a CPU 1903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit is electronic mail messages.

Cryptographic Server

A cryptographic server component 1920 is a stored program component that is executed by a CPU 1903, cryptographic processor 1926, cryptographic processor interface 1927, cryptographic processor device 1928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the GeoTemp may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the GeoTemp component to engage in secure transactions if so desired. The cryptographic component facilitates the secure accessing of resources on the GeoTemp and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The GeoTemp Database

The GeoTemp database component 1919 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the GeoTemp database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the GeoTemp database is implemented as a data-structure, the use of the GeoTemp database 1919 may be integrated into another component such as the GeoTemp component 1935. Also, the database may be implemented as a mix of data structures, objects, and relational structures. Databases may be consolidated and/or distributed in countless variations (e.g., see Distributed GeoTemp below). Portions of databases, e.g., tables, may be exported and/or imported and thus decentralized and/or integrated.

In one embodiment, the database component 1919 includes several tables 1919*a*-1:

An accounts table 1919*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1919*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivlges, userPreferences, userRestrictions, and/or the like (the user table may support and/or track multiple entity accounts on a GeoTemp);

An devices table 1919*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/enus/specification/adopted-specifications, and/or other device specifications, and/or the like;

An apps table 1919*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1919*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, asset-Name, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1919f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1919g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1919h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccess Code, merchantPortNo, merchantAccessPrivileges, merchantPreferences, merchantRestrictions, and/or the like;

An ads table 1919i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherindustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An map imagery table 1919j includes fields such as, but not limited to: mapID, longitudeValue, latitudeValue, boundingRegionArrayValues, locationName, resortName, locationAddress, resortID, mapVersion, mapType, mapServer, mapBoundingRegion, mapZoom, mapDateTime, regionLayoutID, assetID, merchantID, deviceID, userID, accountID, impressionID, impressionOS, impressionTimeStamp, impressionGeo, impressionAction, impressionType, impressionPublisherID, impressionPublisherURL, and/or the like;

An map boundaries table 1919k includes fields such as, but not limited to: mapBoundryID, regionLatVal, regionLonVal, regionRadius, regionBoundingArrayValues, regionDateTime, regionLayoutID, mapID, assetID, merchantID, deviceID, userID, accountID, impressionID, impressionOS, impressionTimeStamp, impressionGeo, impressionAction, impressionType, impressionPublisherID, impressionPublisherURL, and/or the like;

An location layout table 1919l includes fields such as, but not limited to: regionLayoutID, layoutLatVal, layoutLonVal, layoutRadius, layoutBoundingArrayValues, layoutXgridVal, layoutYgridVal, layoutTimeVal, layoutDateTime, mapBoundryID, mapID, assetID, merchantID, deviceID, userID, accoun LID, impressionID, impressionOS, impressionTimeStamp, impressionGeo, impressionAction, impressionType, impressionPublisherID, impressionPublisherURL, and/or the like.

In one embodiment, the GeoTemp database may interact with other database systems. For example, employing a distributed database system, queries and data access by search GeoTemp component may treat the combination of the GeoTemp database, an integrated data security layer database as a single database entity (e.g., see Distributed GeoTemp below).

In one embodiment, user programs may contain various user interface primitives, which is may serve to update the GeoTemp. Also, various accounts may require custom database tables depending upon the environments and the types of clients the GeoTemp may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1919a-1. The GeoTemp may be configured to keep track of various settings, inputs, and parameters via database controllers.

The GeoTemp database may communicate to and/or with other components in a component collection, including itself, and/or facilities of the like. Most frequently, the GeoTemp database communicates with the GeoTemp component, other program components, and/or the like. The database may contain, retain, and provide information regarding other nodes and data.

The GeoTemps

The GeoTemp component 1935 is a stored program component that is executed by a CPU. In one embodiment, the GeoTemp component incorporates any and/or all combinations of the aspects of the GeoTemp that was discussed in the previous figures. As such, the GeoTemp affects accessing, obtaining and the provision of information, services, transactions, and/or the like across various communications networks. The features and embodiments of the GeoTemp discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the GeoTemp's features and facilities, and in many cases reduce the costs, energy consumption/requirements, and extend the life of GeoTemp's underlying infrastructure; this has the added benefit of making the GeoTemp more reliable. Similarly, many of the features and mechanisms are designed to be easier for users to use and access, thereby broadening the audience that may enjoy/employ and exploit the feature sets of the GeoTemp; such ease of use also helps to increase the reliability of the GeoTemp. In addition, the feature sets include heightened security as noted via the Cryptographic components 1920, 1926, 1928 and throughout, making access to the features and data more reliable and secure The GeoTemp transforms user requested area (202), user layout request (1102), user request for product items (1402), layout, section, unit/item position, zone, user item selection inputs, via GeoTemp components (e.g., GeoTemp 1935, GeoTemp Layout Define 1941, item layout 1942, item allocation 1943, map region 1944, map imagery retrieval 1945, location order 1946, product item order component 1947), into location map (230), layout position (1135), booking (1026), goods services dispatch (1326, 1430), item reservation, item directions, inventory request, inventory delivery outputs.

The GeoTemp component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the GeoTemp server employs a cryptographic server to encrypt and decrypt communications. The GeoTemp component may communicate to and/or with other components in a component collection, including itself, and/or facilities of the like. Most frequently, the GeoTemp component communicates with the GeoTemp database, operating systems, other program components, and/or the like. The GeoTemp may contain, communicate, generate, obtain, and/or provide program component, system, user, and/or data communications, requests, and/or responses.

Distributed GeoTemps

The structure and/or operation of any of the GeoTemp node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the GeoTemp controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for GeoTemp controller and/or GeoTemp component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the GeoTemp controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
   $input ="";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/
   index.jsp?topic=/com.ibm.IBMDI.doc/
   referenceguide295.htm and other parser implementations:

http://publib.boulder.ibm.com/infocenter/tivihelp/v2r1/
   index.jsp?topic=/com.ibm.IBMDI.doc/
   referenceguide259.htm all of which are hereby expressly incorporated by reference.

In order to address various issues and advance the art, the entirety of this application for Ad Hoc Item Geo Temporal Location and Allocation Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical,"

"above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a GeoTemp individual and/or enterprise user, database configuration and/or relational model, data type, data transmission and/or network framework, syntax structure, and/or the like, various embodiments of the GeoTemp, may be implemented that enable a great deal of flexibility and customization. For example, aspects of the GeoTemp may be adapted for beaches, seats, stadiums, generalized items. While various embodiments and discussions of the GeoTemp have included geo-location and inventory allocation, however, it is to be understood that the embodiments described herein may be readily configured and/or customized for a wide variety of other applications and/or implementations.

What is claimed is:

1. An ad hoc geographical and temporal mapping and item allocation apparatus, comprising:
a memory;
a component collection in the memory, including:
a processor disposed in communication with the memory, and configured to issue a plurality of processing instructions from the component collection stored in the memory,
wherein the processor issues instructions from the component collection, stored in the memory, to:
obtain a geographical layout message,
wherein the geographical layout message includes: an initial bounding region definition with associated geographical position coordinates, an initial temporal state, an initial section region, an initial zone, an initial asset item, a destination bounding region definition with associated geographical position coordinates, a temporal duration, a destination section region, a destination zone, a destination asset item;
composite a geo-temporal map including asset items allocated within the confines defined by the geographical layout message;
obtain an asset selection message from a user, wherein the asset selection message includes an asset item identifier identifying a physical asset;
allocate a selected physical asset for the user;
update inventory availability accounting for the selected physical asset;
provide updated composite geo-temporal map including updated inventory availability.

2. The apparatus of claim 1, further, comprising: generating a charge to the user for allocation of the physical asset.

3. The apparatus of claim 1, further, comprising: providing gps coordinates for the allocated physical asset.

4. The apparatus of claim 1, wherein the processor issues further instructions from the component collection, stored in the memory, to:
receive a venue indicator;
receive a seating bounding region with associated geographical position coordinates;
receive a selection from a user to participate in activities within the seating bounding region;
generate a database query to retrieve a seating activity layout template for the selected seating bounding region;
composite the retrieved seating activity layout template with the selected seating bounding region.

5. The apparatus of claim 4, wherein the processor further issues instructions from the component collection, stored in the memory, to:
interact with items within the retrieved seating activity layout template.

6. The apparatus of claim 5, wherein the processor further issues instructions from the component collection, stored in the memory, to:
obtain a selection for an item in the retrieved seating activity layout template, indicative of a desire to reserve a spot having X-Y coordinates and temporal stay coordinates.

7. The apparatus of claim 6, wherein the processor further issues instructions from the component collection, stored in the memory, to:
obtain a selection for additional products and services to be provided in the reserved spot at a specified temporal coordinate.

8. The apparatus of claim 6, wherein the processor further issues instructions from the component collection, stored in the memory, to:
obtain an initial composite of the seating boundary region;
load a grid associated with the initial composite to produce a second composite;
select a portion of the second composite for finer selection of a region for further interaction by a user.

9. The apparatus of claim 6, wherein the processor further issues instructions from the component collection, stored in the memory, to:
obtain a selection for additional products and services to be provided in the reserved spot at a specified temporal coordinate, wherein the additional products include at least one of: a lounge chair, a beach chair, and a beach umbrella.

10. The apparatus of claim 6, wherein the processor further issues instructions from the component collection, stored in the memory, to:

obtain a selection for additional products and services to be provided in the reserved spot at a specified temporal coordinate, wherein the additional services include receiving suncare products, beverages, snacks and meals.

* * * * *